United States Patent
Barnes et al.

(10) Patent No.: US 7,110,424 B2
(45) Date of Patent: Sep. 19, 2006

(54) BI-DIRECTIONAL SERIALIZER/DESERIALIZER WITH DISCRETIONARY LOOP-BACK

(75) Inventors: David Andrew Barnes, Pleasanton, CA (US); Walter Michael Pitio, Morganville, NJ (US)

(73) Assignee: Bay Microsystems, Inc., San Jose, CA (US)

( * ) Notice: Subject to any disclaimer, the term of this patent is extended or adjusted under 35 U.S.C. 154(b) by 912 days.

(21) Appl. No.: 10/112,551

(22) Filed: Mar. 29, 2002

(65) Prior Publication Data

US 2003/0202544 A1    Oct. 30, 2003

(51) Int. Cl.
*H04J 3/02*    (2006.01)
(52) U.S. Cl. ........................................ 370/539; 370/541
(58) Field of Classification Search ................ 370/539, 370/541, 535, 534, 532, 537, 540
See application file for complete search history.

(56) References Cited

U.S. PATENT DOCUMENTS

| 6,097,210 | A | 8/2000 | Iwanczuk |
| RE37,401 | E | 10/2001 | Yamashita |
| 6,430,201 | B1 * | 8/2002 | Azizoglu et al. ........... 370/535 |
| 2003/0031133 | A1 * | 2/2003 | Momtaz ..................... 370/241 |

* cited by examiner

Primary Examiner—Brenda Pham

(57) ABSTRACT

A serializer/deserializer pair with a discretionary loop-back mechanism is disclosed that enables a redundant high-bandwidth node architecture that benefits from the clever re-use of two identical integrated circuits. The first is an add/drop multiplexor and the second comprises the serializer/deserializer pair with discretionary loop-back. The illustrative embodiment comprises: a first serializer that serializes a first series of r-bit words to generate a first series of s-bit words; a first deserializer that deserializes a second series of s-bit words to generate a second series of r-bit words; and a multiplexor for selecting a third series of r-bit words from the first series of r-bit words and the second series of r-bit words; wherein r and s are both positive integers and $r \geq s$.

24 Claims, 16 Drawing Sheets

_US 7,110,424 B2_

BI-DIRECTIONAL SERIALIZER/DESERIALIZER WITH DISCRETIONARY LOOP-BACK

FIELD OF THE INVENTION

The present invention relates to telecommunications in general, and, more particularly, to an architecture for a composite add/drop multiplexor, which is commonly used in high-speed backbone networks (e.g., SONET/SDH networks, etc.).

BACKGROUND OF THE INVENTION

The first generation of optical fiber systems in the public telephone network used proprietary architectures, equipment line codes, multiplexing formats, and maintenance procedures. This diversity complicated the task of the regional Bell operating companies ("RBOCs") and the interexchange carriers (e.g., AT&T, Sprint, MCI, etc.) who needed to interface their equipment with these diverse systems.

To ease this task, Bellcore initiated an effort to establish a standard for connecting one optical fiber system to another. That standard is officially named the Synchronous Optical Network, but it is more commonly called "SONET." The international version of the domestic SONET standard is officially named the Synchronous Digital Hierarchy, but it is more commonly called "SDH."

Although differences exist between SONET and SDH, those differences are mostly in terminology. In most respects, the two standards are the same and, therefore, virtually all equipment that complies with either the SONET standard or the SDH standard also complies with the other. Therefore, for the purposes of this specification, the SONET standard and the SDH standard shall be considered interchangeable and the acronym/initialism "SONET/SDH" shall be defined as either the Synchronous Optical Network standard or the Synchronous Digital Hierarchy standard, or both.

SUMMARY OF THE INVENTION

The present invention is a novel serializer/deserializer pair with a discretionary loop-back mechanism that obviates some of the costs and disadvantages associated with node architectures in the prior art. For example, the illustrative embodiment enables a redundant high-bandwidth node architecture that benefits from the clever re-use of two identical integrated circuits. The first is an add/drop multiplexor and the second comprises the serializer/deserializer pair with discretionary loop-back.

The illustrative embodiment comprises: a first serializer that serializes a first series of r-bit words to generate a first series of s-bit words; a first deserializer that deserializes a second series of s-bit words to generate a second series of r-bit words; and a multiplexor for selecting a third series of r-bit words from the first series of r-bit words and the second series of r-bit words; wherein rn and sm are both positive integers and $r \geq s$.

DETAILED DESCRIPTION

Figure 1:
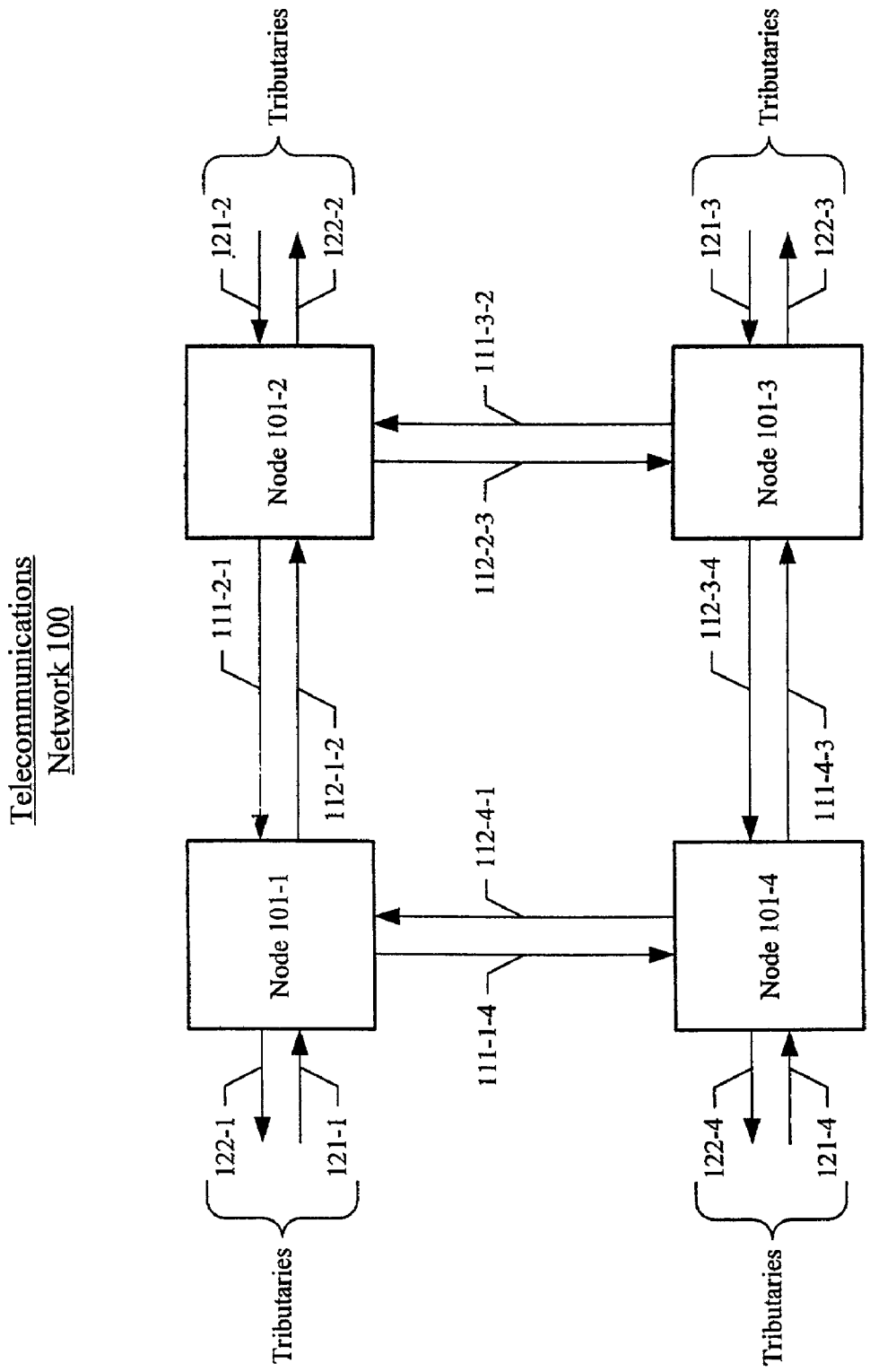
FIG. 1 depicts a block diagram of the illustrative embodiment of the present invention.

FIG. 1 depicts a block diagram of the illustrative embodiment of the present invention, telecommunications network 100, which is a SONET/SDH ring network operating as a bi-directional line switched ring ("BLSR"). In accordance with the illustrative embodiment, telecommunications network 100 comprises four nodes, nodes 101-1 through 101-4, that are interconnected by two sets of optical fibers, each of which carries a SONET/SDH OC-768 signal. Therefore, each node comprises two OC-768 line inputs and two OC-768 line outputs.

Although the illustrative embodiment uses the SONET/SDH protocol, it will be clear to those skilled in the art, after reading this disclosure, how to make and use embodiments of the present invention that use other protocols, such as dense wavelength division multiplexing ("DWDM"). Although the illustrative embodiment is a ring network, it will be clear to those skilled in the art, after reading this disclosure, how to make and use embodiments of the present invention in which some or all of the nodes are interconnected in a mesh or non-ring topology. Although the illustrative embodiment operates as a bi-directional line switched ring, it will be clear to those skilled in the art, after reading this disclosure, how to make and use embodiments of the present invention that operate in a different fashion (e.g., as a unidirectional path switched ring, as a four-fiber ring, etc.). Although the illustrative embodiment comprises four nodes, it will be clear to those skilled in the art, after reading this disclosure, how to make and use embodiments of the present invention that comprise a different number of nodes. Although the illustrative embodiment carries OC-768 SONET/SDH frames, it will be clear to those skilled in the art, after reading this disclosure, how to make and use embodiments of the present invention that carry other SONET/SDH rate frames.

As shown in FIG. 1, node 101-$i$, for i=1 to 4, is capable of receiving sixteen (16) OC-192 tributaries on tributary bus 121-$i$, and of spawning sixteen (16) OC-192 tributaries on tributary bus 122-$i$. Although each node in the illustrative embodiment comprises the same number of tributaries, it will be clear to those skilled in the art, after reading this disclosure, how to make and use embodiments of the present invention in which some or all of the nodes have a different number of tributaries. Although each tributary operates at an OC-192 data rate, it will be clear to those skilled in the art, after reading this disclosure, how to make and use embodiments of the present invention in which some of the tributaries have a different data rate (e.g., OC-48, OC-12, OC-3, etc.). Although each node is capable of receiving sixteen (16) tributaries, it will be clear to those skilled in the art, after reading this disclosure, how to make and use embodiments of the present invention in which some or all of the nodes are capable of receiving a different number of tributaries. Although each node is capable of spawning sixteen (16) tributaries, it will be clear to those skilled in the art, after reading this disclosure, how to make and use embodiments of the present invention in which some or all of the nodes are capable of spawning a different number of tributaries.

In accordance with the illustrative embodiment of the present invention, node 101-$i$ is capable of functioning as an add/drop multiplexor and
  i. a switch, or
  ii. a time-slot interchanger, or
  iii. both i and ii.

In functioning as an add/drop multiplexor, node 101-$i$ is capable of:
  i. adding an STS-1 from any tributary to one or more lines, or
  ii. dropping an STS-1 from a line to one or more tributaries, or
  iii. both i and ii.

In functioning as a switch, node 101-$i$ is capable of routing any STS-1 from any line or tributary to:
  i. one or more lines, or
  ii. one or more tributaries,
  iii. both i and ii.

Because node 101-$i$ is capable of receiving an STS-1 signal from one tributary and switching or copying it onto another tributary, and because this is an important aspect of the illustrative embodiment, it is given the name "hairpinning." For the purposes of this specification, the term "hairpinning" is defined as the receipt by a node of a signal on one tributary and the outputting of the signal onto another tributary.

In functioning as a time-slot interchanger, node 101-$i$ is capable of moving or copying any STS-1 from any time slot in any line or tributary to one or more other time slots in the same line or tributary.

Figure 2:
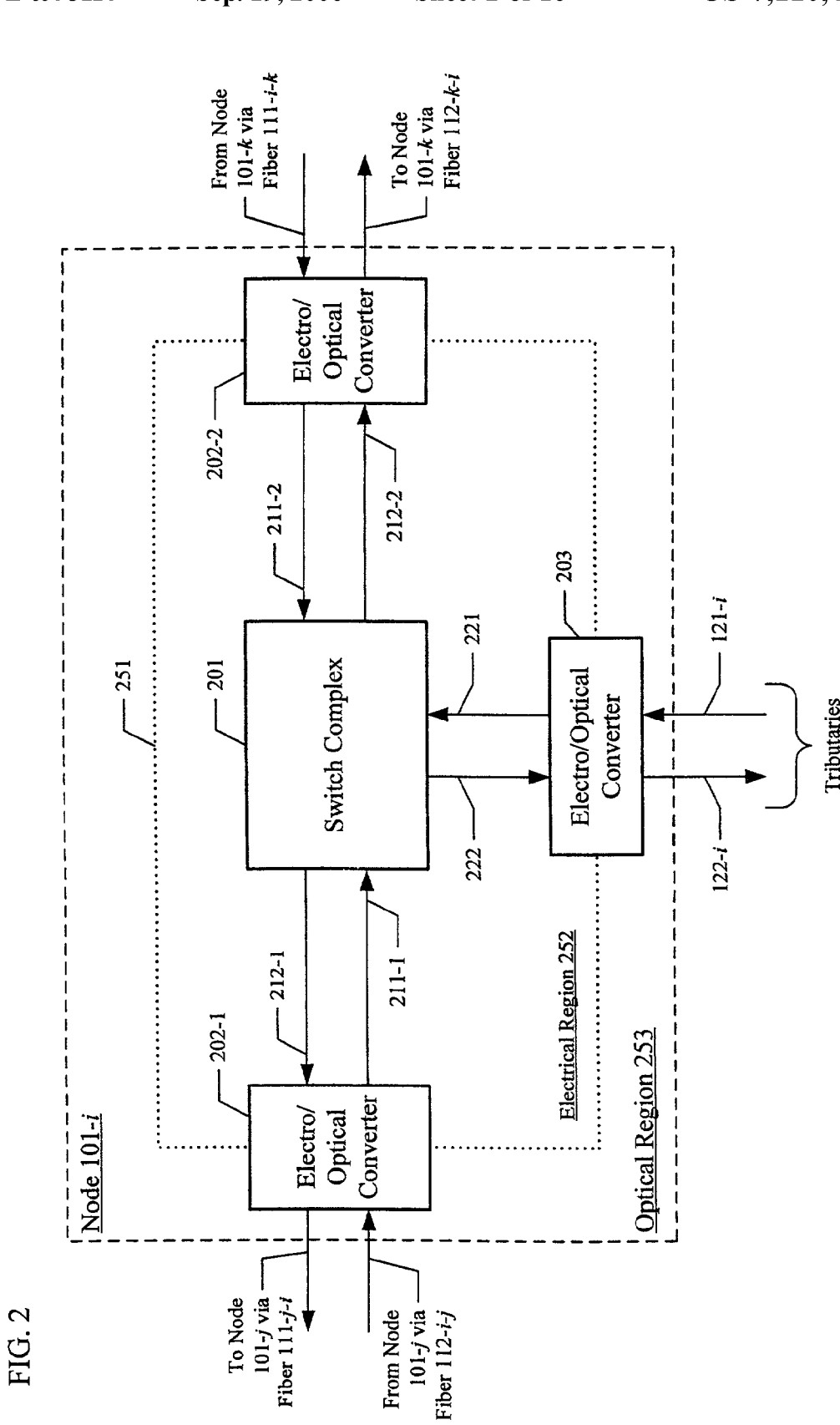
FIG. 2 depicts a block diagram of node 101-$i$, as shown in FIG. 1.

FIG. 2 depicts a block diagram of the salient components of node 101-$i$, which comprises switch complex 201, electro/optical converter 202-$j$, for j=1 and 2, and electro/optical converter 203, interconnected as shown.

Node 101-$i$ receives:
  1. one (1) OC-768 SONET/SDH line signal from node 101-$j$ via optical fiber 112-$j$-$i$,
  2. one (1) OC-768 SONET/SDH line signal from node 101-$k$ via optical fiber 111-$k$-$i$, and
  3. sixteen (16) OC-192 SONET/SDH tributary signals via tributary bus 121-$i$, and transmits:
  1. one (1) OC-768 SONET/SDH signal to node 101-$j$ via optical fiber 111-$i$-$j$,
  2. one (1) OC-768 SONET/SDH signal to node 101-$k$ via optical fiber 112-$i$-$k$, and
  3. sixteen (16) OC-192 SONET/SDH tributary signals via tributary bus 122-$i$;

wherein k=4 and j=2 when i=1, k=1 and j=3 when i=2, k=2 and j=4 when i=3, and k=3 and j=1 when i=4.

Optical/electrical boundary 251 delimits the two regions within node 101-$i$ wherein the line and tributary signals are carried by different physical phenomenon. In particular, the line and tributary signals in optical region 253 are carried optically, in well-known fashion, and the line and tributary signals in electrical region 252 are carried electrically, also in well-known fashion. It will be clear to those skilled in the art, however, and after reading this disclosure, how to make and use embodiments of the present invention in which some or all of the tributaries are carried electrically or electromagnetically (e.g., via wireless, etc.).

Electro/optical converter 202-$j$ and 203 perform conversion between optical signals and electrical signals in well-known fashion. Electro/optical converter 202-$j$ performs an optical-to-electrical conversion on line signals traveling from optical region 253 to electrical region 252 and an electrical-to-optical conversion on line signals traveling from electrical region 252 to optical region 253. Electro/optical converter 203 performs an optical-to-electrical conversion on tributary signals traveling from optical region 253 to electrical region 252 and an electrical-to-optical conversion on tributary signals traveling from electrical region 252 to optical region 253.

Switch complex 201 receives:
  1. one (1) OC-768 SONET/SDH line signal from electro/optical converter 202-1 via bus 211-1,
  2. one (1) OC-768 SONET/SDH line signal from electro/optical converter 202-2 via bus 211-2, and
  3. sixteen (16) OC-192 SONET/SDH tributary signals from electro/optical converter 203 via tributary bus 221, and transmits:
  1. one (1) OC-768 SONET/SDH signal to electro/optical converter 202-1 via bus 212-1,
  2. one (1) OC-768 SONET/SDH signal to electro/optical converter 202-2 via bus 212-2, and
  3. sixteen (16) OC-192 SONET/SDH tributary signals to electro/optical converter 203 via tributary bus 222.

When the number of bits per second to be processed by an add/drop multiplexor is low, it is feasible to fabricate the add/drop multiplexor on a single integrated circuit using state-of-the-art technology. In contrast, when the number of bits per second to be processed by a add/drop multiplexor is high, it is not feasible to fabricate the add/drop multiplexor on a single integrated circuit using state-of-the-art technology because the input/output bandwidth and number of devices on the integrated circuit are too limited.

In accordance with the illustrative embodiment, switch complex 201 receives 40 gigabits per second on each of lines 211-1 and 211-2 and 160 gigabits per second on tributary bus 221 and, therefore, must process a total of 240 gigabits per second. This is too many bits per second to be processed by a single contemporary integrated circuit with the flexibility and reliability afforded by the illustrative embodiment. Therefore, the overall task of processing the 240 gigabits per second must be partitioned into a plurality of subtasks that are distributed among a plurality of integrated circuits.

Partitioning the overall task of processing 240 gigabits per second into a plurality of subtasks suitable for distribution among a plurality of integrated circuits is not simple or obvious because the subtasks do not naturally lend themselves to the limitations in inherent in multiple integrated circuits that are not found in a single integrated circuit. In other words, a digital circuit design that is suitable for implementation on one integrated circuit might not, depending on the circumstances, be suitable for implementation on two integrated circuits.

First, the bandwidth within one integrated circuit is far greater than the bandwidth between multiple integrated circuits. For example, a five-thousand lead bus is far more feasible within one integrated circuit than it is between two integrated circuits. In other words, by partitioning digital circuit into a plurality of integrated circuits, a bandwidth bottleneck is imposed between the various integrated circuits. In some applications, the bandwidth bottleneck is not a problem. In an add/drop multiplexor such as that disclosed herein, the bandwidth bottleneck is a problem and is exacerbated when the add/drop multiplexor is capable of hairpinning.

Second, the timing within a single integrated circuit is far more synchronous than is the timing across a plurality of integrated circuits. In some low clock speed applications, the potential asynchrony is not a problem. In an add/drop multiplexor such as that disclosed herein that operates at gigahertz clock rates over inches or feet, the potential asynchrony might be catastrophic.

Third, the design and manufacture of each fully-custom integrated circuit is expensive, and, therefore, the partitioning of the overall task needs to consider this fact.

Fourth, some architectures will partition the overall task more reliably, more flexibly, and more-easily scalable than some other architectures and all of these issues must be considered.

With these considerations in mind, the logic within switch complex 201 is partitioned into a plurality of integrated circuits and functional units as described below and with respect to FIGS. 3 through 16.

Figure 3:
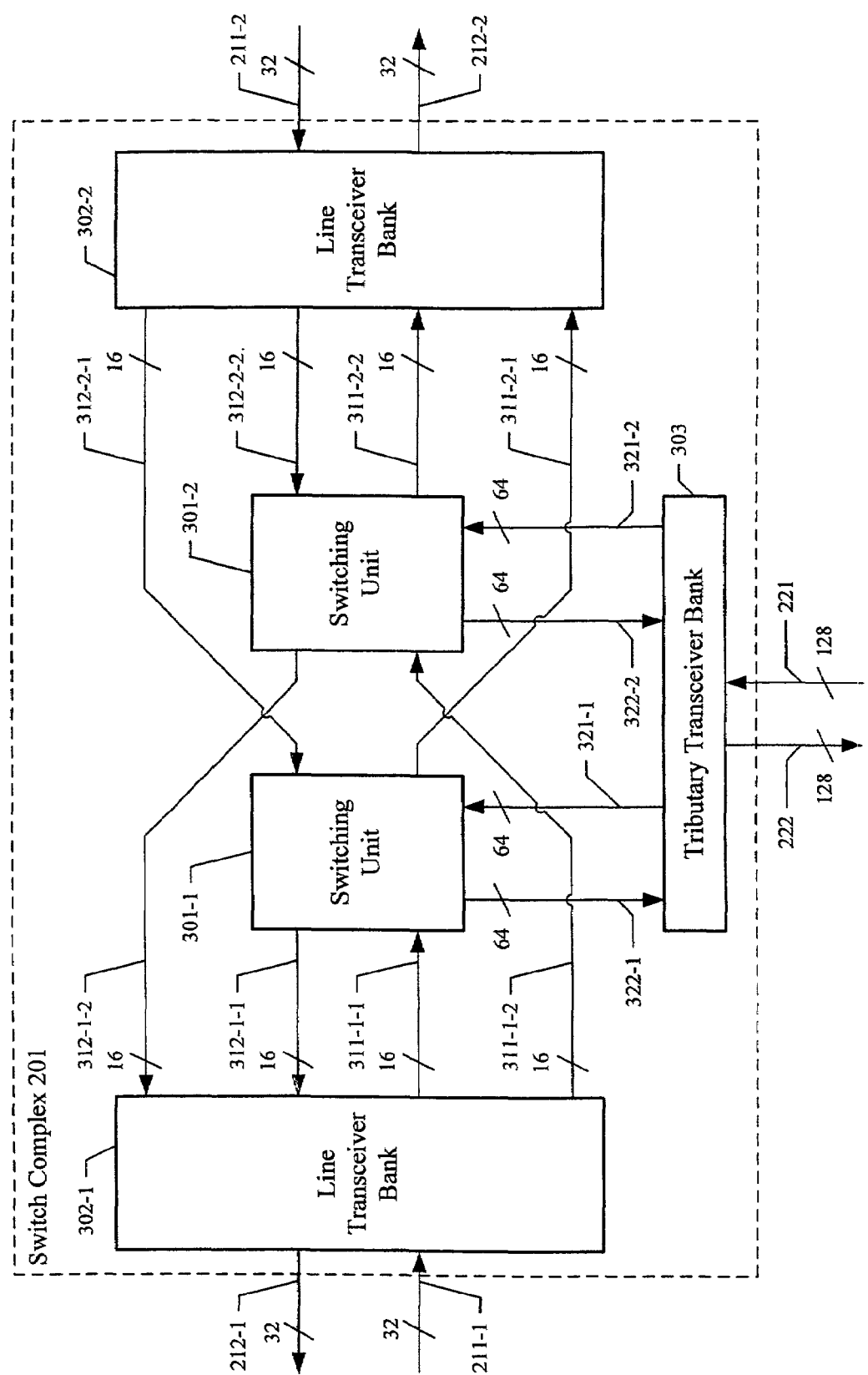
FIG. 3 depicts a block diagram of switch complex 201, as shown in FIG. 2.

FIG. 3 depicts a block diagram of the salient components of switch complex 201, which comprises switching unit 301-$b$, for b=1 and 2, line transceiver bank 302-$m$, for m=1 and 2, and tributary transceiver bank 303, interconnected as shown.

Switching unit 301-$b$ receives:
one (1) OC-768 SONET/SDH line signal from line transceiver bank 302-1 via bus 311-1-$b$, which is a 3.125 GHz 16-bit bus,
one (1) OC-768 SONET/SDH line signal from line transceiver bank 302-2 via bus 311-2-$b$, which is a 3.125 GHz 16-bit bus, and
sixteen (16) OC-192 SONET/SDH tributary signals from tributary transceiver bank 303 via bus 321-$b$, which is a 3.125 GHz 32-bit bus, and transmits:
one (1) OC-768 SONET/SDH line signal to line transceiver bank 302-1 via bus 312-1-$b$, which is a 3.125 GHz 16-bit bus,
one (1) OC-768 SONET/SDH line signal to line transceiver bank 302-2 via bus 312-2-$b$, which is a 3.125 GHz 16-bit bus, and
sixteen (16) OC-192 SONET/SDH tributary signals to tributary transceiver bank 303 via bus 322-$b$, which is a 3.125 GHz 32-bit bus.

Switching units 301-1 and 301-2 are redundant, which enables a hot-swappable, robust architecture in which both switching units are running—except when one has been removed for repair or upgrade—but the output of only one of the switching units is used by switch complex 201 at any given moment. For example, when the output of switching unit 301-1 is used by switch complex 201 and fails, then switch complex 201 uses the output of switching unit 301-2. It is the task of line transceiver bank 302-$m$ and tributary transceiver bank 303 to ensure that the signal path through node 101-$i$ carries traffic through the active switching unit. It will be clear to those skilled in the art, after reading this disclosure, how to make and use equipment that can detect a failure, reassign active status to a new switching unit, and to subsequently reroute the signal path through the new active switching unit. Although switch complex 201 comprises two switching units, it will also be clear to those skilled in the art, after reading this disclosure, how to make and use systems having more than two switching units.

Switching unit 301-1 and 301-2 are separate system components, such as separate circuit cards, for reasons related to fault tolerance and ease of maintenance that are well known to those skilled in the art. Line transceiver bank 302-$m$ and tributary transceiver bank 303 are also separate system components. It will be clear to those skilled in the art that "separate system components" can refer to other configurations wherein switching unit 301-$b$, line transceiver bank 302-$m$, and tributary transceiver bank are all separated in some way (e.g., multiple integrated circuits, multiple cabinets, etc.).

The design of switching unit 301-$b$ is described below and with respect to FIGS. 4, 5, 15, and 16.

The design of line transceiver bank 302-1 is described in detail below and with respect to FIGS. 6, 12 through 14, and 16.

The design of line transceiver bank 302-2 is described in detail below and with respect to FIGS. 7, 12 through 14, and 16.

The design of tributary transceiver bank 303 is described in detail below and with respect to FIGS. 10, 12 through 14, and 16.

Figure 4:
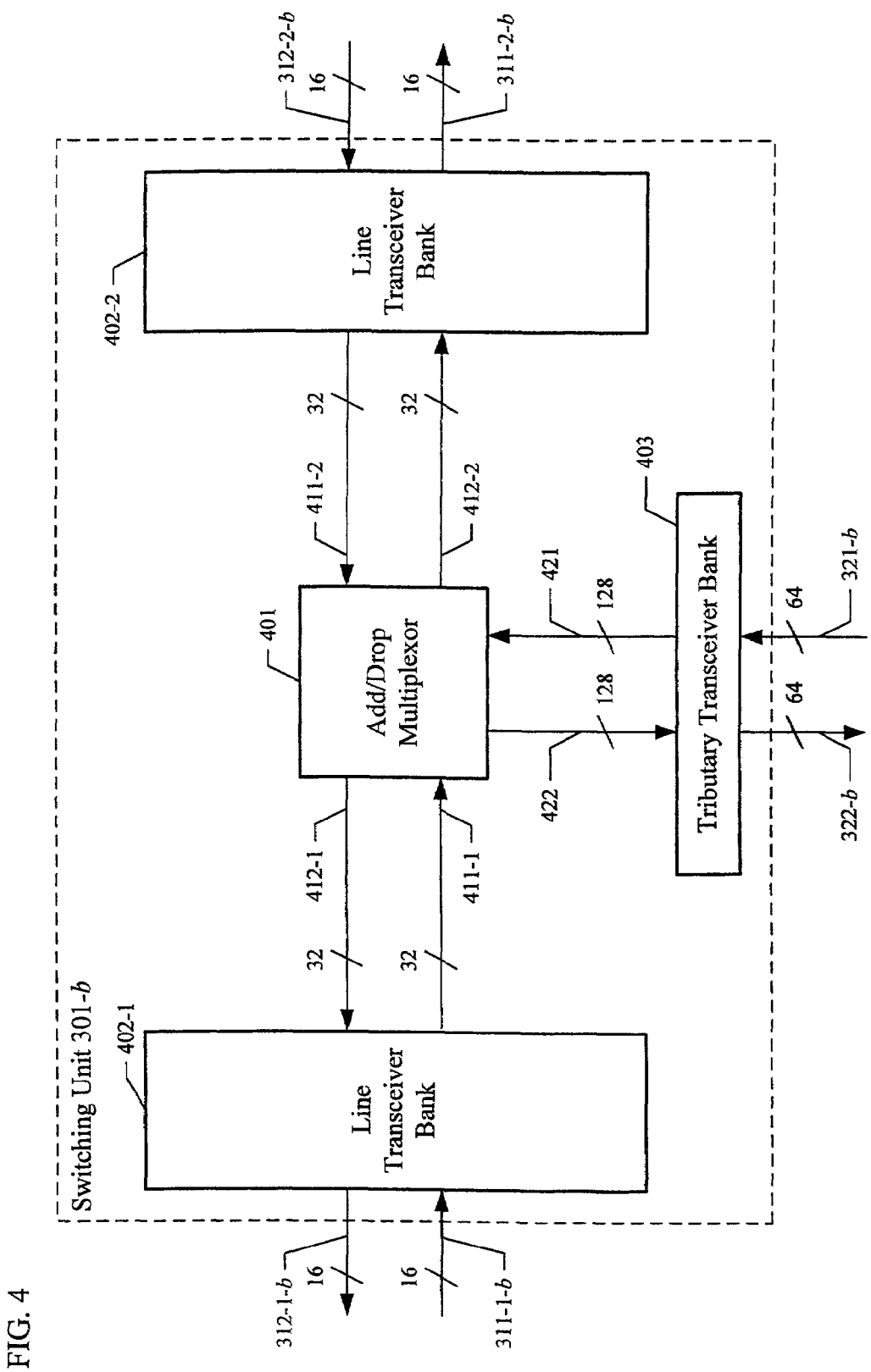
FIG. 4 depicts a block diagram of switching unit 301-$b$, as shown in FIG. 3.

FIG. 4 depicts a block diagram of the salient components of switching unit 301-$b$, which comprises add/drop multiplexor 401, line transceiver bank 402-$n$, for n=1 and 2, and tributary transceiver bank 403, interconnected as shown.

Add/drop multiplexor 401 receives:
one (1) OC-768 SONET/SDH line signal from line transceiver bank 402-1 via bus 411-1, which is a 1.25 GHz 32-bit bus,
one (1) OC-768 SONET/SDH line signal from line transceiver bank 402-2 via bus 411-2, which is a 1.25 GHz 32-bit bus, and
sixteen (16) OC-192 SONET/SHD tributary signals from tributary transceiver bank 403 via bus 421, which is a 1.25 GHz 128-bit bus, and transmits:
one (1) OC-768 SONET/SDH line signal to line transceiver bank 402-1 via bus 412-1, which is a 1.25 GHz 32-bit bus,
one (1) OC-768 SONET/SDH line signal to line transceiver bank 402-2 via bus 412-2, which is a 1.25 GHz 32-bit bus, and
sixteen (16) OC-192 SONET/SDH tributary signals to tributary transceiver bank 403 via bus 422, which is a 1.25 GHz 128-bit bus.

Add/drop multiplexor 401 is capable of functioning as:
i. an add/drop multiplexor, or
ii. a switch, or
iii. a time-slot interchanger, or
iv. any combination of i, ii, and iii.

Furthermore, add/drop multiplexor 401 is capable of:
  i. adding an STS-1 from any tributary to one or more lines, or
  ii. dropping an STS-1 from a line to one or more tributaries, or
  iii. both i and ii.

And still furthermore, add/drop multiplexor 401 is capable of routing any STS-1 from any line or tributary to:
  i. one or more lines, or
  ii. one or more tributaries,
  iii. both i and ii.

And yet furthermore, add/drop multiplexor 401 is capable of moving or copying any STS-1 from any time slot in any line or tributary to one or more other time slots in the same line or tributary.

The design of add-drop multiplexor 401 is described in detail below and with respect to FIGS. 5, 15, and 16.

The design of line transceiver bank 402-1 is described in detail below and with respect to FIGS. 8 and 12 through 16.

The design of line transceiver bank 402-2 is described in detail below and with respect to FIGS. 9 and 12 through 16.

The design of tributary transceiver bank 303 is described in detail below and with respect to FIGS. 10, 12 through 15 and 16.

Figure 5:
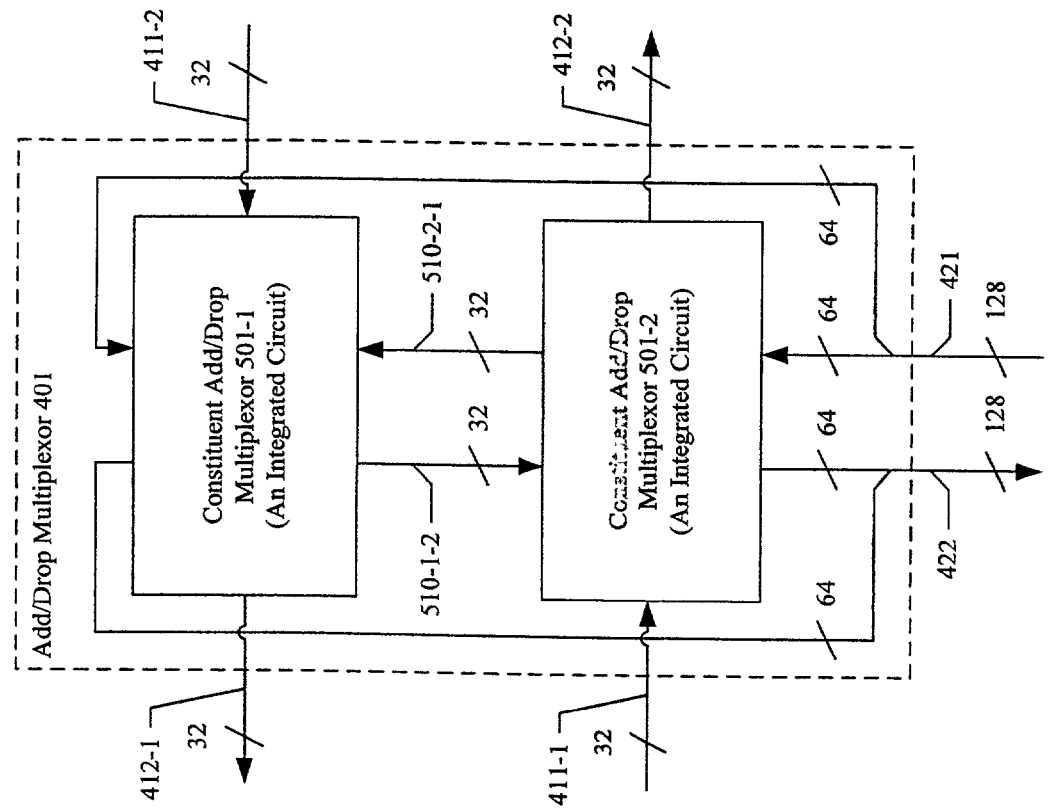
FIG. 5 depicts a block diagram of add/drop multiplexor 401, as shown in FIG. 4.

FIG. 5 depicts a block diagram of the salient components of add/drop multiplexor 401, which comprises constituent add/drop multiplexor 501-$p$, for p=1 and 2. In accordance with the illustrative embodiment, constituent add/drop multiplexor ('CAD") 501-$p$ is an integrated circuit.

Constituent add/drop multiplexor 501-1 receives:
  one (1) OC-768 SONET/SDH line signal from line transceiver bank 402-2 via bus 411-2, which is a 1.25 GHz 32-bit bus,
  one (1) OC-768 SONET/SDH line signal from constituent add/drop multiplexor 501-2 via line 510-2-1, which is a 1.25 GHz 32-bit bus, and
  eight (8) OC-192 SONET/SHD tributary signals from tributary transceiver bank 403 via one-half of bus 421 which is a 1.25 GHz 128-bit bus, and transmits:
  one (1) OC-768 SONET/SDH line signal to line transceiver bank 402-1 via bus 412-1, which is a 1.25 GHz 32-bit bus,
  one (1) OC-768 SONET/SDH line signal to constituent add/drop multiplexor 501-2 via line 510-1-2, which is a 1.25 GHz 32-bit bus, and
  eight (8) OC-192 SONET/SHD tributary signals to tributary transceiver bank 403 via one-half of bus 422 which is a 1.25 GHz 128-bit bus.

Constituent add/drop multiplexor 501-2 receives:
  one (1) OC-768 SONET/SDH line signal from line transceiver bank 402-1 via bus 411-1, which is a 1.25 GHz 32-bit bus,
  one (1) OC-768 SONET/SDH line signal from constituent add/drop multiplexor 501-1 via line 510-1-2, which is a 1.25 GHz 32-bit bus, and
  eight (8) OC-192 SONET/SHD tributary signals from tributary transceiver bank 403 via one-half of bus 421 which is a 1.25 GHz 128-bit bus, and transmits:
  one (1) OC-768 SONET/SDH line signal to line transceiver bank 402-2 via bus 412-2, which is a 1.25 GHz 32-bit bus,
  one (1) OC-768 SONET/SDH line signal to constituent add/drop multiplexor 501-1 via line 510-2-1, which is a 1.25 GHz 32-bit bus, and
  eight (8) OC-192 SONET/SHD tributary signals to tributary transceiver bank 403 via one-half of bus 421 which is a 1.25 GHz 128-bit bus.

Like add/drop multiplexor 401, constituent add/drop multiplexor 501-$p$ is capable of functioning as:
  i. an add/drop multiplexor and
  ii. a switch, or
  iii. a time-slot interchanger, or
  iv. any combination of i, ii, and iii.

Furthermore, constituent add/drop multiplexor 501-$p$ is capable of:
  i. adding an STS-1 from any tributary to one or more lines, or
  ii. dropping an STS-1 from a line to one or more tributaries, or
  iii. both i and ii.

And still furthermore, constituent add/drop multiplexor 501-$p$ is capable of routing any STS-1 from any line or tributary to:
  i. one or more lines, or
  ii. one or more tributaries,
  iii. both i and ii.

And yet furthermore, constituent add/drop multiplexor 501-$p$ is capable of moving or copying any STS-1 from any time slot in any line or tributary to one or more other time slots in the same line or tributary.

In accordance with the illustrative embodiment, constituent add/drop multiplexor 501-1 and constituent add/drop multiplexor 501-2 are each fabricated as identical integrated circuits.

It will be clear to those skilled in the art how to make and use add/drop multiplexor 401. For example, one architecture for making and using add/drop multiplexor 401 is taught in U.S. patent application Ser. No. 09/973,972, entitled "Composite Add/Drop Multiplexor," filed on Nov. 9, 2001, which is incorporated by reference.

It will be clear to those skilled in the art how to make and use constituent add/drop multiplexor 501-$p$. For example, one architecture for making and using constituent add/drop multiplexor 501-$p$ is taught in U.S. patent application Ser. No. 09/974,448, entitled "Switching Network," filed on Oct. 10, 2001, which is incorporated by reference.

Figure 6:
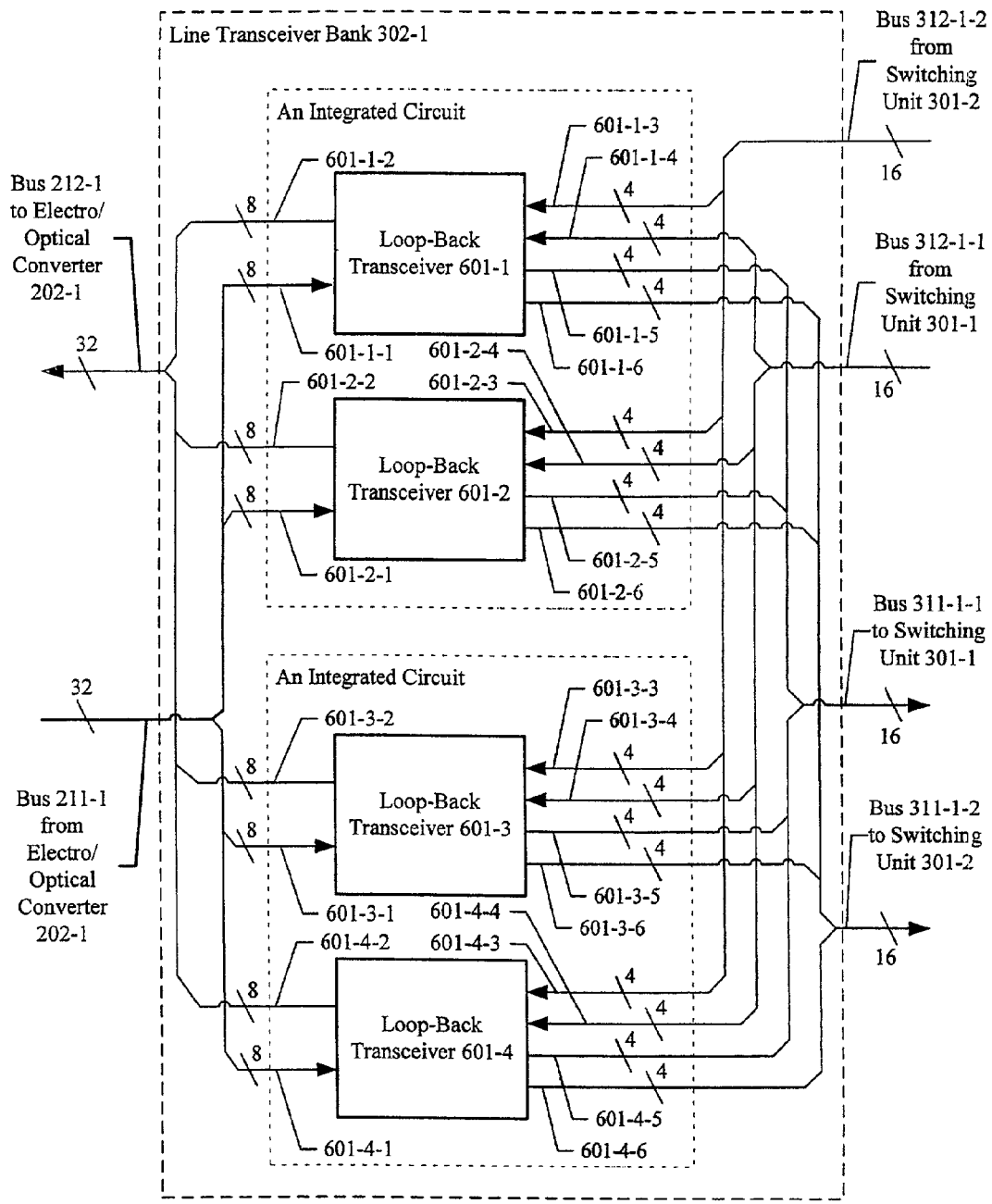
FIG. 6 depicts a block diagram of line transceiver bank 302-1, as shown in FIG. 3.

FIG. 6 depicts a block diagram of line transceiver bank 302-1, which comprises four loop-back transceivers, loop-back transceiver 601-$q$, for q=1 to 4. In accordance with the illustrative embodiment, two loop-back transceivers are fabricated on a single integrated circuit. Therefore, line transceiver bank 302-1 comprises two integrated circuits.

In line transceiver bank 302-1, transceiver 601-$q$ receives:
  1. a fraction of an OC-768 SONET/SDH signal from electro/optical converter 202-1 via bus 601-$q$-1 of 8-bit width,
  2. a fraction of an OC-768 SONET/SDH signal from switching unit 301-2 via bus 601-$q$-3 of 4-bit width, and
  3. a fraction of an OC-768 SONET/SDH signal from switching unit 301-1 via bus 601-$q$-4 of 4-bit width, and transmits:
  1. a fraction of an OC-768 SONET/SDH signal to electro/optical converter 202-1 via bus 601-$q$-2 of 8-bit width,
  2. a fraction of an OC-768 SONET/SDH signal to switching unit 301-1 via bus 601-$q$-5 of 4-bit width, and
  3. a fraction of an OC-768 SONET/SDH signal to switching unit 301-2 via bus 601-$q$-6 of 4-bit width.

Line transceiver bank 302-1 performs a number of functions, which include:

i. serializing the OC-768 SONET/SDH signal from electro/optical converter 202-1, ii. adding parity bits to the OC-768 SONET/SDH signal from electro/optical converter 202-1 so that forward error correction can be performed on the signal by both switching unit 301-1 and 301-2, iii. adding framing bits to the OC-768 SONET/SDH signal from electro/optical converter 202-1 so that frame, word, and symbol synchronization can be facilitated by both switching unit 301-1 and 301-2, iv. transmitting the serialized OC-768 SONET/SDH signal from electro/optical converter 202-1 to both switching unit 301-1 and 301-2, v. deserializing the OC-768 SONET/SDH signals from both switching unit 301-1 and 301-2, vi. performing forward error correction on the OC-768 SONET/SDH signals from both switching unit 301-1 and 301-2, vii. performing bit, symbol, and word synchronization on the OC-768 SONET/SDH signals from both switching unit 301-1 and 301-2, and viii. selecting whether the OC-768 SONET/SDH signal from switching unit 301-1 or from switching unit 301-2 is output to electro/optical converter 202-1 via bus 212-1.

The design and operation of loop-back transceiver 601-$q$ is described below and with respect to FIGS. 12 through 14.

Figure 7:
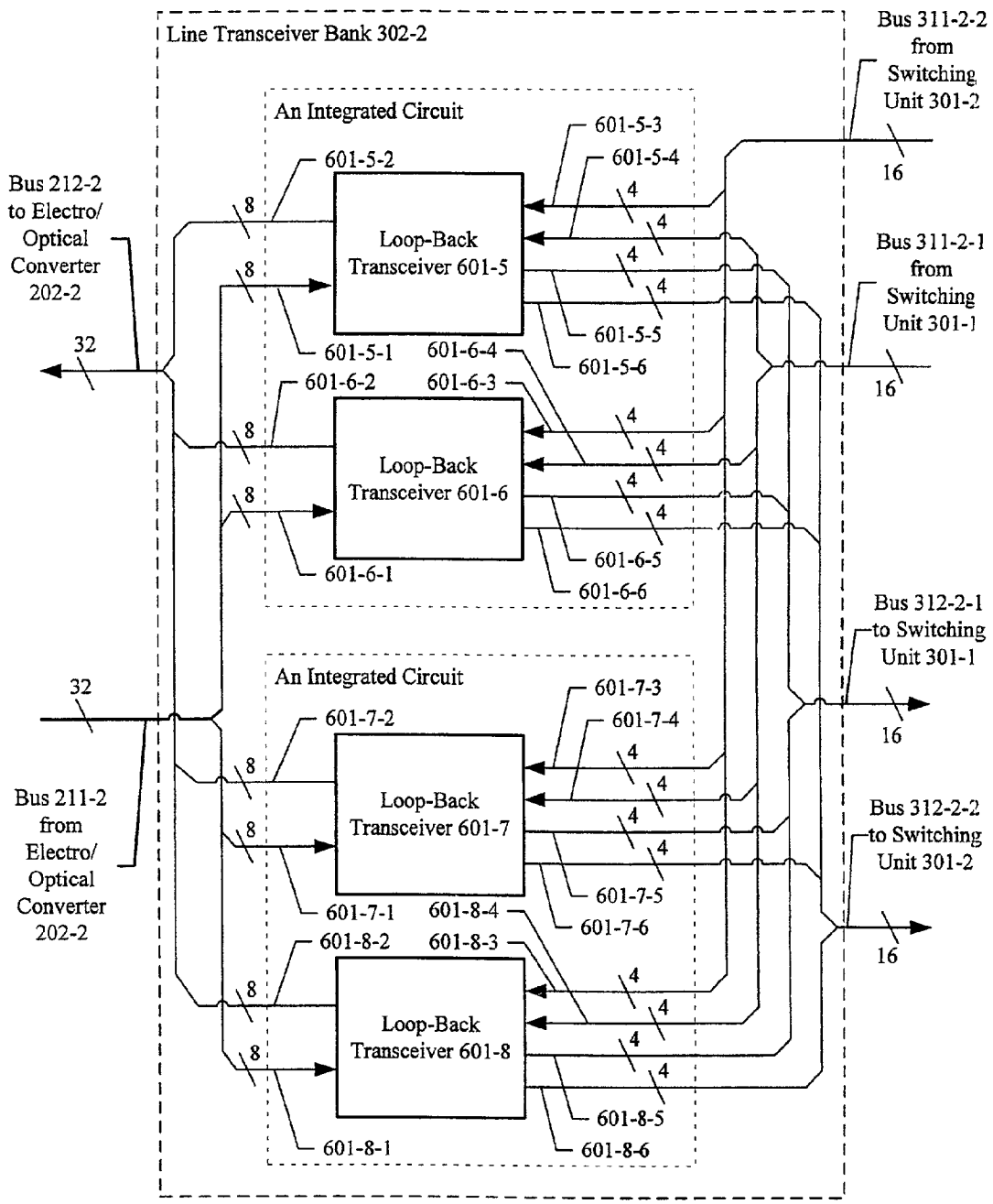
FIG. 7 depicts a block diagram of line transceiver bank 302-2, as shown in FIG. 3.

FIG. 7 depicts a block diagram of line transceiver bank 302-2, which comprises four loop-back transceivers, loop-back transceiver 601-$q$, for q=5 to 8. In accordance with the illustrative embodiment, two loop-back transceivers are fabricated on a single integrated circuit. Therefore, line transceiver bank 302-2 comprises two integrated circuits.

In line transceiver bank 302-2, transceiver 601-$q$ receives:

1. a fraction of an OC-768 SONET/SDH signal from electro/optical converter 202-2 via bus 601-$q$-1 of 8-bit width, 2. a fraction of an OC-768 SONET/SDH signal from switching unit 301-2 via bus 601-$q$-3 of 4-bit width, and 3. a fraction of an OC-768 SONET/SDH signal from switching unit 301-1 via bus 601-$q$-4 of 4-bit width; and transmits:

1. a fraction of an OC-768 SONET/SDH signal to electro/optical converter 202-2 via bus 601-$q$-2 of 8-bit width, 2. a fraction of an OC-768 SONET/SDH signal to switching unit 301-1 via bus 601-$q$-5 of 4-bit width, and 3. a fraction of an OC-768 SONET/SDH signal to switching unit 301-2 via bus 601-$q$-6 of 4-bit width.

Line transceiver bank 302-2 performs a number of functions, which include:

i. serializing the OC-768 SONET/SDH signal from electro/optical converter 202-2, ii. adding parity bits to the OC-768 SONET/SDH signal from electro/optical converter 202-2 so that forward error correction can be performed on the signal by both switching unit 301-1 and 301-2, iii. adding framing bits to the OC-768 SONET/SDH signal from electro/optical converter 202-2 so that frame, word, and symbol synchronization can be facilitated by both switching unit 301-1 and 301-2, iv. transmitting the serialized OC-768 SONET/SDH signal from electro/optical converter 202-2 to both switching unit 301-1 and 301-2, v. deserializing the OC-768 SONET/SDH signals from both switching unit 301-1 and 301-2, vi. performing forward error correction on the OC-768 SONET/SDH signals from both switching unit 301-1 and 301-2, vii. performing bit, symbol, and word synchronization on the OC-768 SONET/SDH signals from both switching unit 301-1 and 301-2, and viii. selecting which OC-768 SONET/SDH signal from switching unit 301-1 or 301-2 is output to electro/optical converter 202-2 via bus 212-2.

The design and operation of loop-back transceiver 601-$q$ is described below and with respect to FIGS. 12 through 14.

Figure 8:
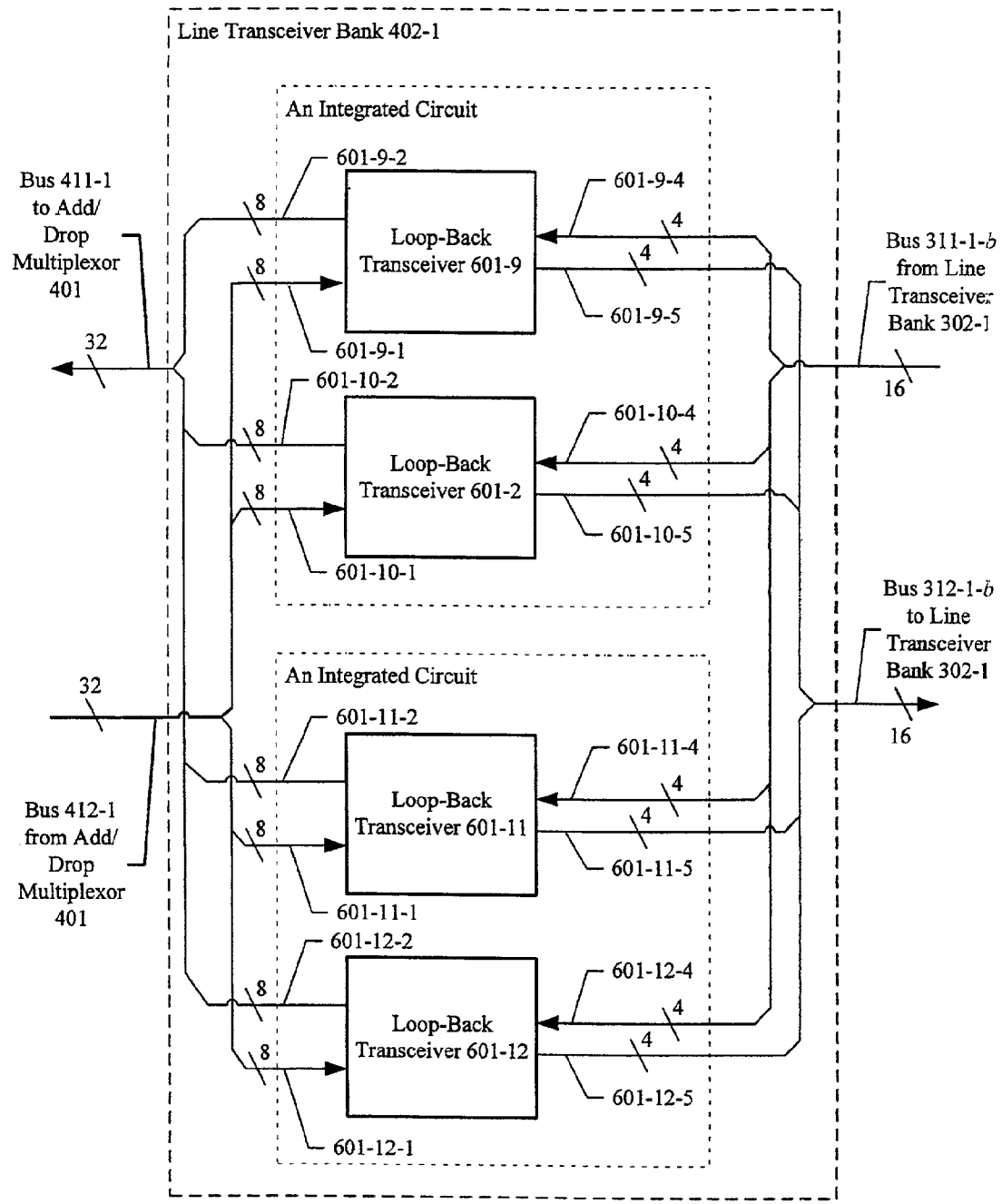
FIG. 8 depicts a block diagram of line transceiver bank 402-1, as shown in FIG. 4.

FIG. 8 depicts a block diagram of line transceiver bank 402-1, which comprises four loop-back transceivers, loop-back transceiver 601-$q$, for q=9 to 12. In accordance with the illustrative embodiment, two loop-back transceivers are fabricated on a single integrated circuit. Therefore, line transceiver bank 402-1 comprises two integrated circuits.

In line transceiver bank 402-1, transceiver 601-$q$ receives:

1. a fraction of an OC-768 SONET/SDH signal from add/drop multiplexor 401 via bus 601($q$-8)-1 of 8-bit width, and 2. a fraction of an OC-768 SONET/SDH signal from line transceiver bank 302-1 via bus 601-($q$-8)-4 of 4-bit width; and transmits:

1. a fraction of an OC-768 SONET/SDH signal to add/drop multiplexor 401 via bus 601-($q$-8)-2 of 8-bit width, 2. a fraction of an OC-768 SONET/SDH signal to line transceiver bank 302-1 via bus 601($q$-8)-5 of 4-bit width.

Line transceiver bank 402-1 performs a number of functions, which include:

i. serializing the OC-768 SONET/SDH signal from add/drop multiplexor 401, ii. adding parity bits to the OC-768 SONET/SDH signal from add/drop multiplexor 401 so that forward error correction can be performed on the signal by line transceiver bank 302-1, iii. adding framing bits to the OC-768 SONET/SDH signal from add/drop multiplexor 401 so that frame, word, and symbol synchronization can be facilitated by line transceiver bank 302-1, iv. transmitting the serialized OC-768 SONET/SDH signal from add/drop multiplexor 401 to line transceiver bank 302-1, v. deserializing the OC-768 SONET/SDH signal from line transceiver bank 302-1, vi. performing forward error correction on the OC-768 SONET/SDH signal from line transceiver bank 302-1, vii. performing bit, symbol, and word synchronization on the OC-768 SONET/SDH signals from line transceiver bank 302-1, and viii. looping back, when necessary or advantageous, the OC-768 SONET/SDH signal from bus 412-1 to bus 411-1.

The loop-back function, in particular, when combined with the serializing and deserializing functions, enables switch complex 201 to be functionally flexible, scalable, hot-swappable, and hot-sparable. The design and operation of loop-back transceiver 601-$q$ is described below and with respect to FIGS. 12 through 14.

Figure 9:
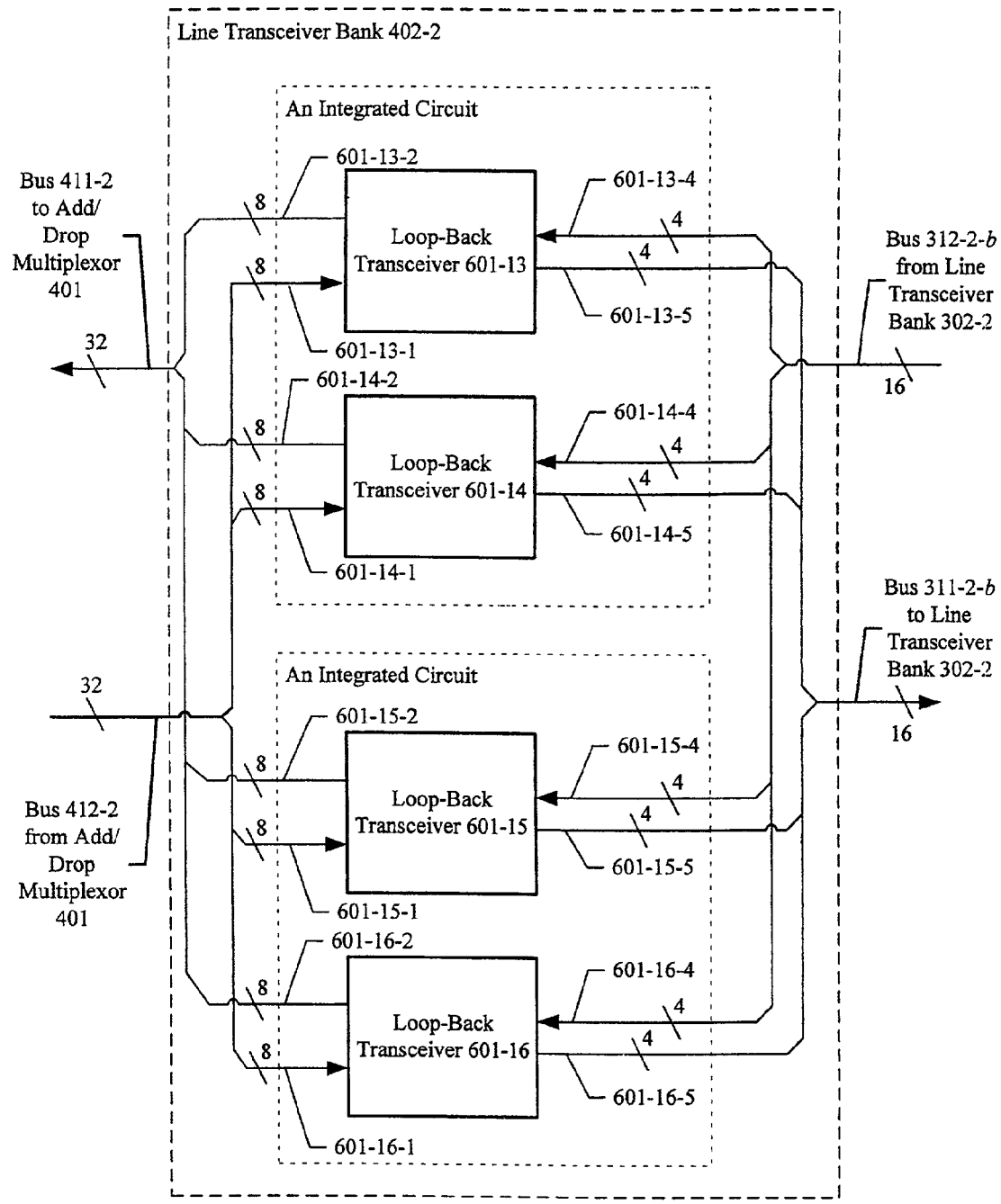
FIG. 9 depicts a block diagram of line transceiver bank 402-2, as shown in FIG. 4.

FIG. 9 depicts a block diagram of line transceiver bank 402-2, which comprises four loop-back transceivers, transceiver 601-$q$, for q=13 to 16. In accordance with the illustrative embodiment, two loop-back transceivers are fabricated on a single integrated circuit. Therefore, line transceiver bank 402-2 comprises two integrated circuits.

Loop-back transceiver 601-*q* receives:

1. a fraction of an OC-768 SONET/SDH signal from add/drop multiplexor 401 via bus 601-(*q*-12)-1 of 8-bit width, and 2. a fraction of an OC-768 SONET/SDH signal from line transceiver bank 302-1 via bus 601-(*q*-12)-4 of 4-bit width; and transmits:

1. a fraction of an OC-768 SONET/SDH signal to add/drop multiplexor 401 via bus 601-(*q*-12)-2 of 8-bit width, 2. a fraction of an OC-768 SONET/SDH signal to line transceiver bank 302-2 via bus 601-(*q*-12)-5 of 4-bit width.

Line transceiver bank 402-2 performs a number of functions, which include:
   i. serializing the OC-768 SONET/SDH signal from add/drop multiplexor 401,
   ii. adding parity bits to the OC-768 SONET/SDH signal from add/drop multiplexor 401 so that forward error correction can be performed on the signal by line transceiver bank 302-2,
   iii. adding framing bits to the OC-768 SONET/SDH signal from add/drop multiplexor 401 so that frame, word, and symbol synchronization can be facilitated by line transceiver bank 302-2,
   iv. transmitting the serialized OC-768 SONET/SDH signal from add/drop multiplexor 401 to line transceiver bank 302-2,
   v. deserializing the OC-768 SONET/SDH signal from line transceiver bank 302-2,
   vi. performing forward error correction on the OC-768 SONET/SDH signal from line transceiver bank 302-2,
   vii. performing bit, symbol, and word synchronization on the OC-768 SONET/SDH signals from line transceiver bank 302-2, and
   viii. looping back, when necessary or advantageous, the OC-768 SONET/ISDH signal from bus 412-2 to bus 411-2.

The loop-back function, in particular, when combined with the serializing and deserializing functions, enables switch complex 201 to be functionally flexible, scalable, hot-swappable, and hot-sparable. The design and operation of loop-back transceiver 601-*q* is described below and with respect to FIGS. 12 through 14.

Figure 10:
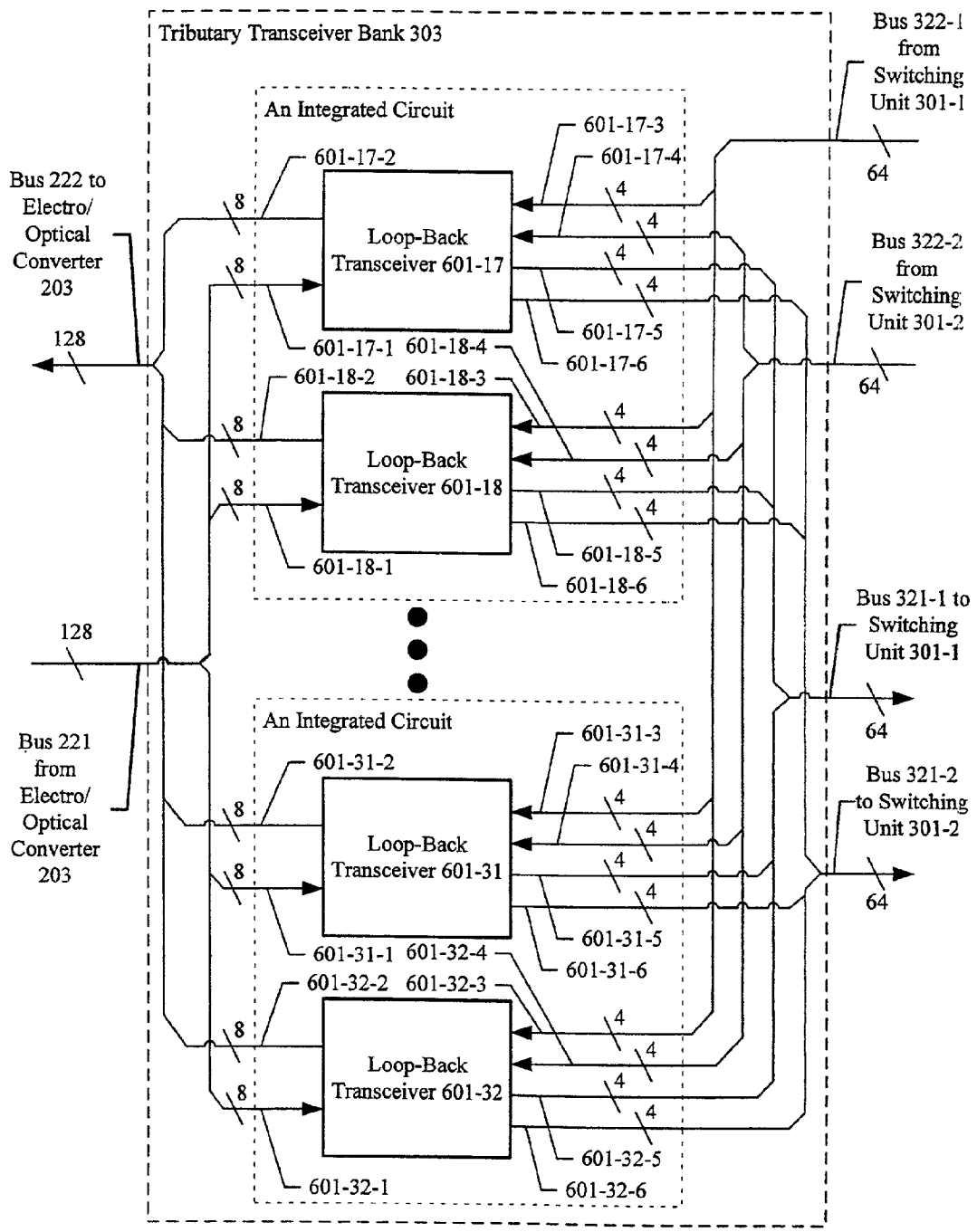
FIG. 10 depicts a block diagram of tributary transceiver bank 303, as shown in FIG. 3.

FIG. 10 depicts a block diagram of tributary transceiver bank 303, which comprises sixteen loop-back transceivers, loop-back transceiver 601-*q*, for q=17 to 32. In accordance with the illustrative embodiment, two loop-back transceivers are fabricated on a single integrated circuit. Therefore, tributary transceiver bank 303 comprises eight integrated circuits.

In tributary transceiver bank 303, transceiver 601-*q* receives:

1. one (1) OC-192 SONET/SDH signal from electro/optical converter 203 via bus 601-(*q*-16)-1 of 8-bit width, 2. one (1) OC-192 SONET/SDH signal from switching unit 301-1 via bus 601-(*q*-16)-3 of 4-bit width, and 3. one (1) OC-192 SONET/SDH signal from switching unit 301-2 via bus 601-(*q*-16)-4 of 4-bit width; and transmits:

1. one (1) OC-192 SONET/SDH signal to electro/optical converter 203 via bus 601-(*q*-16)-2 of 8-bit width, 2. one (1) OC-192 SONET/SDH signal to switching unit 301-1 via bus 601-(*q*-16)-5 of 4-bit width, and 3. one (1) OC-192 SONET/SDH signal to switching unit 301-2 via bus 601-(*q*-16)-6 of 4-bit width.

Tributary transceiver bank 303 performs a number of functions, which include:
   i. serializing the sixteen (16) OC-192 SONET/SDH signals from electro/optical converter 203,
   ii. adding parity bits to the sixteen (16) OC-192 SONET/SDH signals from electro/optical converter 202-1 so that forward error correction can be performed on the signal by both switching unit 301-1 and 301-2,
   iii. adding framing bits to the sixteen (16) OC-192 SONET/SDH signals from electro/optical converter 202-1 so that frame, word, and symbol synchronization can be facilitated by both switching unit 301-1 and 301-2,
   iv. transmitting all sixteen (16) OC-192 SONET/SDH signals from electro/optical converter 202-1 to both switching unit 301-1 and 301-2,
   v. deserializing the sixteen (16) OC-192 SONET/SDH signals from both switching unit 301-1 and 301-2,
   vi. performing forward error correction on the sixteen (16) OC-192 SONET/SDH signals from both switching unit 301-1 and 301-2,
   vii. performing bit, symbol, and word synchronization on the sixteen (16) OC-192 SONET/SDH signals from both switching unit 301-1 and 301-2, and
   viii. selecting whether the sixteen (16) OC-192 SONET/SDH signals from switching unit 301-1 or from switching unit 301-2 is output to electro/optical converter 203 via bus 222.

The design and operation of loop-back transceiver 601-*q* is described below and with respect to FIGS. 12 through 14.

Figure 11:
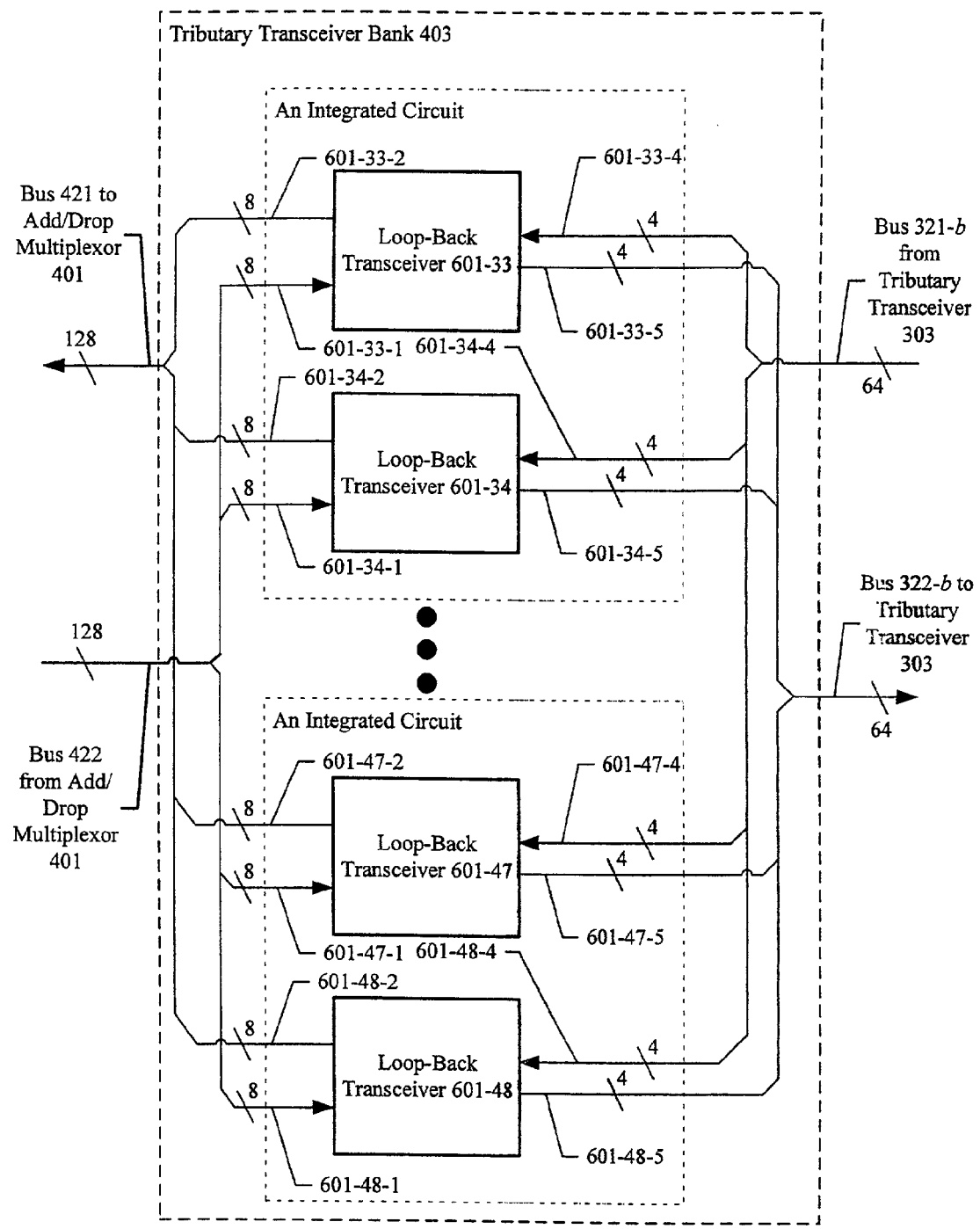
FIG. 11 depicts a block diagram of tributary transceiver bank 403, as shown in FIG. 4.

FIG. 11 depicts a block diagram of tributary transceiver bank 403, which comprises sixteen loop-back transceivers loop-back transceiver 601-*q*, for q=33 to 48. In accordance with the illustrative embodiment, two loop-back transceivers are fabricated on a single integrated circuit. Therefore, tributary transceiver bank 403 comprises eight integrated circuits.

Loop-back transceiver 601-*q* receives:

1. one (1) OC-192 SONET/SDH signal from add/drop multiplexor 401 via bus 601-(*q*-24)-1 of 8-bit width, and 2. one (1) OC-192 SONET/SDH signal from tributary transceiver bank 303 via bus 601-(*q*-24)-4 of 4-bit width; and transmits:

1. one (1) OC-192 SONET/SDH signal to add/drop multiplexor 401 via bus 601-(*q*-24)-2 of 8-bit width, and 2. one (1) OC-192 SONET/SDH signal to tributary transceiver bank 303 via bus 601-(*q*-24)-5 of 4-bit width.

Tributary transceiver bank 403 performs a number of functions, which include:
   i. serializing the sixteen (16) OC-192 SONET/SDH signals from add/drop multiplexor 401 for transmission to tributary transceiver 303,
   ii. adding parity bits to the sixteen (16) OC-192 SONET/SDH signals from add/drop multiplexor 401 so that forward error correction can be performed on the signals by tributary transceiver 303,
   iii. adding framing bits to the sixteen (16) OC-192 SONET/SDH signals from add/drop multiplexor 401 so that frame, word, and symbol synchronization can be facilitated by tributary transceiver 303,
   iv. transmitting all sixteen (16) OC-192 SONET/SDH signals from add/drop multiplexor 401 to tributary transceiver 303,
   v. deserializing the sixteen (16) OC-192 SONET/SDH signals from tributary transceiver 303, vi. performing forward error correction on the sixteen (16) OC-192 SONET/SDH signals from tributary transceiver 303, vii. performing bit, symbol, and word synchronization on the sixteen (16) OC-192 SONET/SDH signals from tributary transceiver 303, viii. transmitting eight (8) of the sixteen (16) OC-192 signals to constituent add/drop multiplexor 501-1 (shown in FIG. 5), and ix. transmitting the other eight (8) of the sixteen (16) OC-192 signals to constituent add/drop multiplexor 501-2 (which is also shown in FIG. 5).

The design and operation of loop-back transceiver 601-$q$ is described below and with respect to FIGS. 12 through 14.

Figure 12:
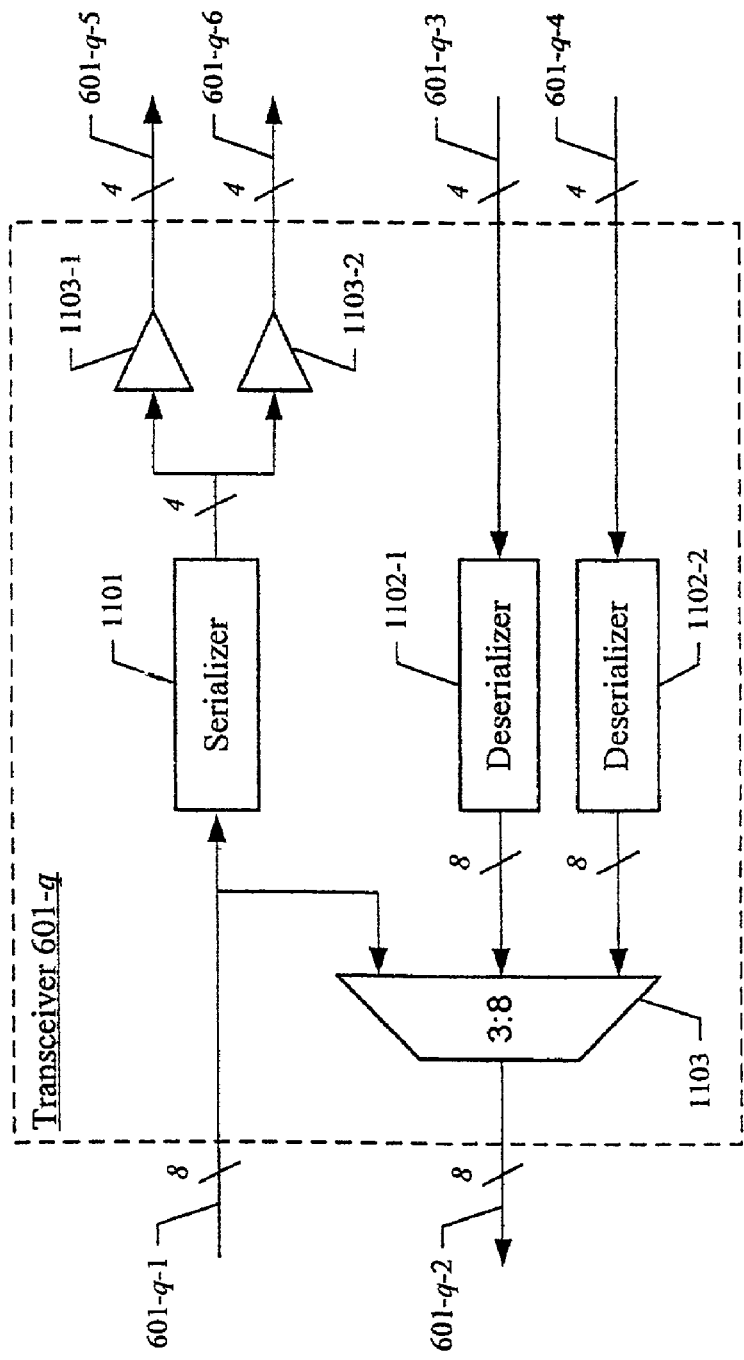
FIG. 12 depicts a block diagram the first illustrative embodiment of loop-back transceiver 601-$q$, as shown in FIG. 6.
Figure 13:
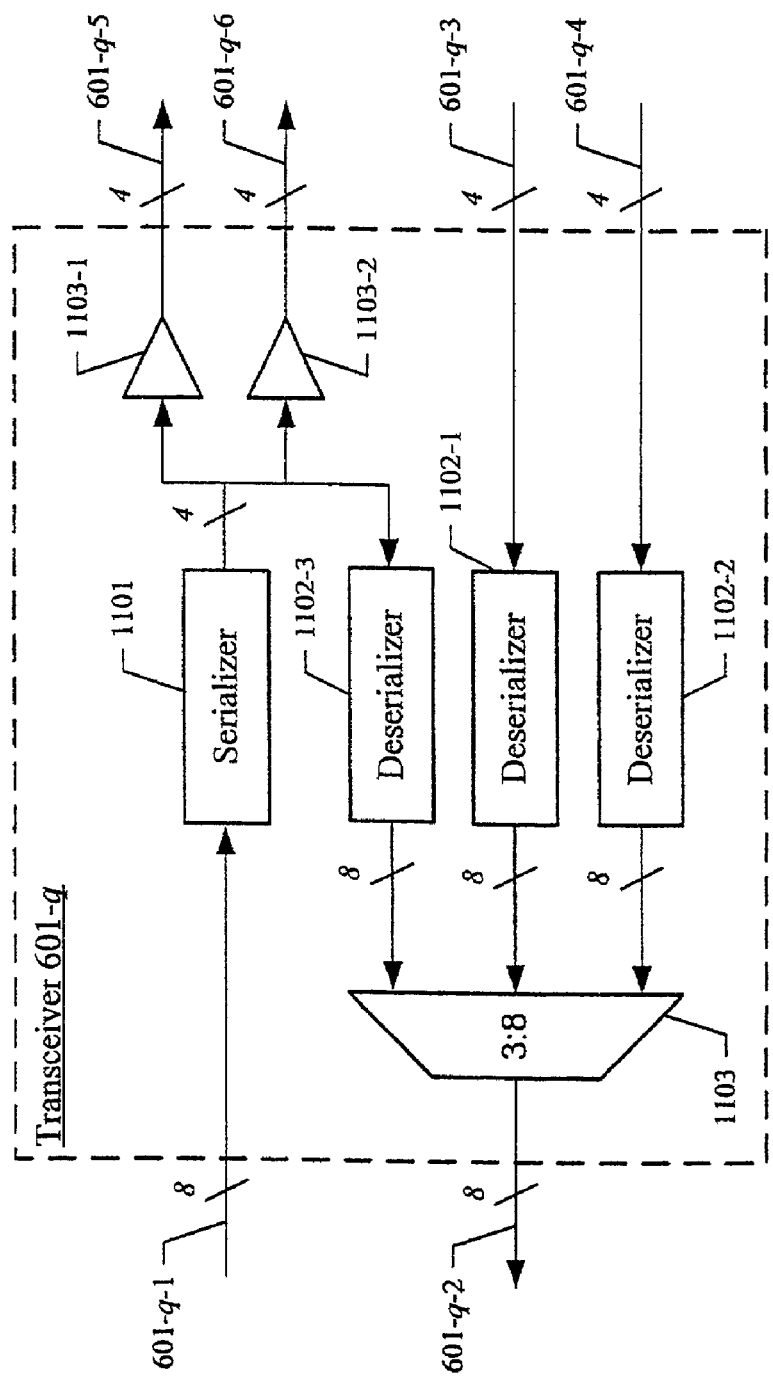
FIG. 13 depicts a block diagram the second illustrative embodiment of loop-back transceiver 601-$q$, as shown in FIG. 6.
Figure 14:
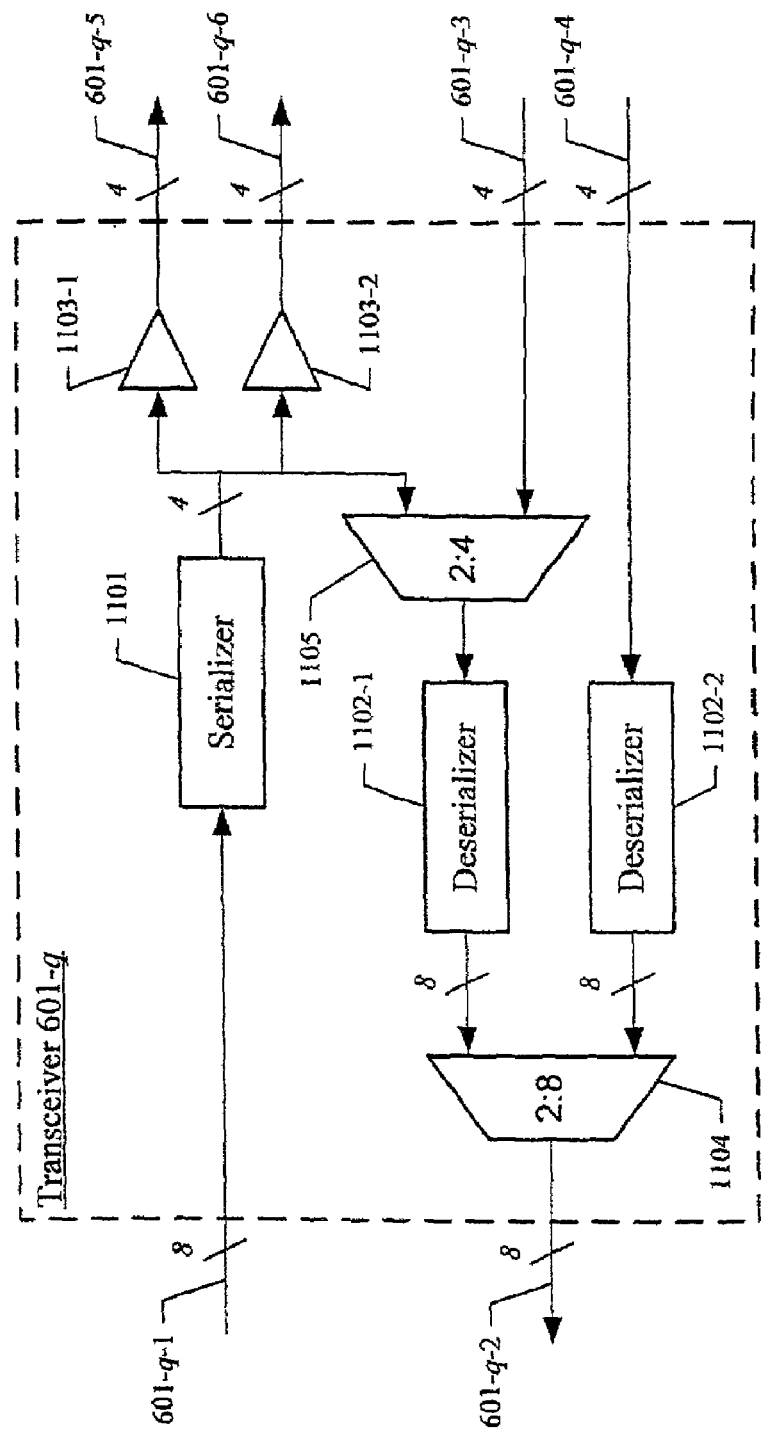
FIG. 14 depicts a block diagram the third illustrative embodiment of loop-back transceiver 601-$q$, as shown in FIG. 6.

FIGS. 12, 13, and 14 each depict block diagrams of three alternative embodiments of loop-back transceiver 601-$q$.

Each of the three alternative embodiments comprises a serializer, serializer 1101, that serializes a series of r-bit words into a series of s-bit words. It will be clear to those skilled in the art how to make and use serializer 1101. For example, U.S. patent application Ser. No. 10/011,938, entitled "Serializer," filed on Dec. 5, 2001, which is incorporated by reference, teaches a serializer that is suitable for use with some embodiments of the present invention. Although loop-back transceiver 601-$q$ serializes r-bit words into s-bit words and adds parity and framing bits, it will be clear to those skilled in the art, after reading this specification, how to make and use transceivers that serialize words of different than r-bit widths into words of different than s-bits widths.

Each of the three alternative embodiments comprises one or more deserializers, deserializer 1102-1, 1102-2, and 1102-3, that deserialize a series of s-bit words into a series of r-bit words. It will be clear to those skilled in the art how to make and use deserializer 1102-1, 1102-2, and 1102-3. For example, U.S. patent application Ser. No. 09/909,499, entitled "Deserializer," filed on Jul. 20, 2001, which is incorporated by reference, teaches a deserializer that is suitable for use with some embodiments of the present invention. Although loop-back transceiver 601-$q$ deserializes s-bit words into r-bit words, it will be clear to those skilled in the art, after reading this specification, how to make and use transceivers that deserialize words of other than s-bit widths into words of other than r-bit widths.

Whenever system components on different assemblies communicate, the bit error rate for signals transmitted between the components tends to be higher than for system components that are fabricated on one assembly. Similarly, whenever system components on different assemblies communicate, the skew for signals transmitted between the components tends to be greater than for system components that are fabricated on one assembly. In accordance with the illustrative embodiment, line transceiver bank 402-1 is fabricated on a different assembly than is line transceiver bank 302-1, line transceiver bank 402-2 is fabricated on a different assembly than is line transceiver bank 302-2, and tributary transceiver bank 303 is fabricated on a different assembly than is tributary transceiver bank 403. Therefore, line transceiver bank 302-1, 302-2, 402-1, and 402-2, and tributary transceiver banks 303 and 403 incorporate mechanisms for forward error correction and symbol and word synchronization. It will be clear to those skilled in the art how to make and use these mechanisms. For example, U.S. patent application Ser. No. 10/014,371, entitled "Forward Error Correction and Framing Protocol," filed Jan. 8, 2002, which is incorporated by reference, teaches a protocol for use with a serializer for adding parity and framing bits to a serialized bit stream so that forward error correction and symbol and word synchronization can be performed.

FIG. 12 depicts the first illustrative embodiment of loop-back transceiver 601-$q$, which comprises serializer 1101, deserializer 1102-1, deserializer 1102-2, and multiplexor 1103.

Serializer 1101 serializes the series of r-bit words on bus 601-$q$-1 into a series of s-bit words, wherein r and s are both positive integers and r≧s. Serializer 1101 also adds parity bits to the signal on bus 601-$q$-1 to enable forward error correction and also adds framing bits to the signal on bus 601-$q$-1 to enable frame, word, and symbol synchronization.

The output signal of serializer 1101 is passed through two drivers for driving the output signal off of loop-back transceiver 601-$q$ via two different sets of pads associated with each of buses 601-$q$-5 and 601-$q$-6.

Deserializer 1102-1 deserializes the series of s-bit words on bus 601-$q$-3 into a series of r-bit words. Deserializer 1102-1 also performs forward error correction and frame, word, and symbol synchronization on the series of s-bit words on bus 601-$q$-3.

Deserializer 1102-2 deserializes the series of s-bit words on bus 601-$q$-4 into a series of r-bit words. Deserializer 1102-2 also performs forward error correction and frame, word, and symbol synchronization on the series of s-bit words on bus 601-$q$-4.

All of the deserializers in a transceiver bank cooperate to perform word synchronization, as is taught in U.S. patent applications Ser. Nos. 09/909,499 and 10/014,371.

Multiplexor 1103 selects the signal on bus 601-$q$-2 from the output signal of deserializer 1102-1, the output signal of deserializer 1102-2, and the signal on bus 601-$q$-1. When multiplexor 1103 selects the signal on bus 601-$q$-2 from the signal on bus 601-$q$-1, the signal is looped back into the relevant add/drop multiplexor. This is useful for providing a conduit when performing automatic protection switching. Multiplexor 1103 also enables line transceiver bank 302-1 and 302-2 and tributary transceiver bank 303 to decide whether to use the output of switching unit 301-1 or 301-2, which is useful in enabling switch complex 201 to be hot-swappable and hot-sparable.

FIG. 13 depicts the second illustrative embodiment of loop-back transceiver 601-$q$ which comprises serializer 1101, deserializer 1102-1, deserializer 1102-2, and deserializer 1102-3, and multiplexor 1103. Serializer 1101 serializes the series of r-bit words on bus 601-$q$-1 into a series of s-bit words. Serializer 1101 also adds parity bits to the signal on bus 601-$q$-1 to enable forward error correction and also adds framing bits to the signal on bus 601-$q$-1 to enable frame, word, and symbol synchronization.

The output signal of serializer 1101 is passed through two drivers for driving the output signal off of loop-back transceiver 601-$q$ via two pads, corresponding to bus 601-$q$-5 and 601-$q$-6.

Deserializer 1102-1 deserializes the series of s-bit words on bus 601-$q$-3 into a series of r-bit words. Deserializer 1102-1 also performs forward error correction and frame, word, and symbol synchronization on the series of r-bit words on bus 601-$q$-3.

Deserializer 1102-2 deserializes the series of s-bit words on bus 601-$q$-4 into a series of r-bit words. Deserializer 1102-2 also performs forward error correction an frame, word, and symbol synchronization on the signal on bus 601-$q$-4.

Deserializer 1102-3 deserializes the series of s-bit words output by serializer 1101 into a series of r-bit words.

Deserializer 1102-3 also performs forward error correction and frame, word, and symbol synchronization on the output signal of serializer 1101.

Multiplexor 1103 selects the signal on bus 601-$q$-2 from the output signals of deserializer 1102-1, deserializer 1102-2, and deserializer 1102-3. When multiplexor 1103 selects the signal on bus 601-$q$-2 from the signal on bus 601-$q$-1, the signal is looped back into the relevant add/drop multiplexor. This is useful for providing a conduit when performing automatic protection switching. Multiplexor 1103 also enables line transceiver bank 302-1 and 302-2 and tributary transceiver bank 303 to decide whether to use the output of switching unit 301-1 or 301-2, which is useful in enabling switch complex 201 to be hot-swappable and hot-sparable.

FIG. 14 depicts the third illustrative embodiment of loop-back transceiver 601-$q$, which comprises serializer 1101, deserializer 1101-1, deserializer 1101-1, multiplexor 1104, and multiplexor 1105. Serializer 1101 serializes the series of r-bit words on bus 601-$q$-1 into a series of s-bit words. Serializer 1101 also adds parity bits to the signal on bus 601-$q$-1 to enable forward error correction and also adds framing bits to the signal on bus 601-$q$-1 to enable frame, word, and symbol synchronization.

The output signal of serializer 1101 is passed through two drivers for driving the output signal off of loop-back transceiver 601-$q$ via two pads, corresponding to bus 601-$q$-5 and 601-$q$-6.

Multiplexor 1105 selects the input into deserializer 1102-1 from the output of serializer 1101 and the series of s-bit words on bus 601-$q$-3.

Deserializer 1102-1 deserializes the output series of s-bit words of multiplexor 1105 into a series of r-bit words. Deserializer 1102-1 also performs forward error correction and frame, word, and symbol synchronization on the output signal of multiplexor 1105.

Deserializer 1102-2 deserializes the series of s-bit words on bus 601-$q$-4 into a series of r-bit words. Deserializer 1102-2 also performs forward error correction and frame, word, and symbol synchronization on the signal on bus 601-$q$-4.

Multiplexor 1104 selects the signal on bus 601-$q$-2 from the output signal of deserializer 1102-1 and the output signal of deserializer 1102-2.

When multiplexor 1104 selects the signal on bus 601-$q$-2 from the signal on bus 601-$q$-1, the signal is looped back into the relevant add/drop multiplexor. This is useful for providing a conduit when performing automatic protection switching. Multiplexor 1103 also enables line transceiver bank 302-1 and 302-2 and tributary transceiver bank 303 to decide whether to use the output of switching unit 301-1 or 301-2, which is useful in enabling switch complex 201 to be hot-swappable and hot-sparable.

There are advantages to each of the three alternative embodiments of loop-back transceiver 601-$q$ as they are depicted in FIG. 12, 13, and 14. In the first illustrative embodiment depicted in FIG. 12, the loop-back bus requires a minimal change in hardware, requiring no additional deserializer or multiplexor and resulting in relatively low cost for the loop-back bus. Specifically, to support the loop-back bus, multiplexor 1103 must handle three input signals instead of two.

In the second illustrative embodiment depicted in FIG. 13, the loop-back bus is achieved by using a frame-encoded signal at the output of serializer 1101. This method offers high reliability, important for high-speed applications in particular. Since the looped back signal is passed through a deserializer, as are the serialized inputs to loop-back transceiver 601-$q$, there is a lack of relative delay between the unserialized inputs to multiplexor 1103.

In the third illustrative embodiment depicted in FIG. 14, the loop-back bus is also achieved by using a frame-encoded signal at the output of serializer 1101. This method offers high reliability, important for high-speed applications in particular. This looped-back signal must then be selected by multiplexor 1105 and deserialized. This approach is attractive if multiplexor 1105 can be implemented at low cost and if the relative delay into multiplexor 1104 is tolerable.

Input 601-$q$-3 is not used in the loop-back transceivers used in line transceiver 402-1, 402-2, and tributary transceiver 403.

Figure 15:
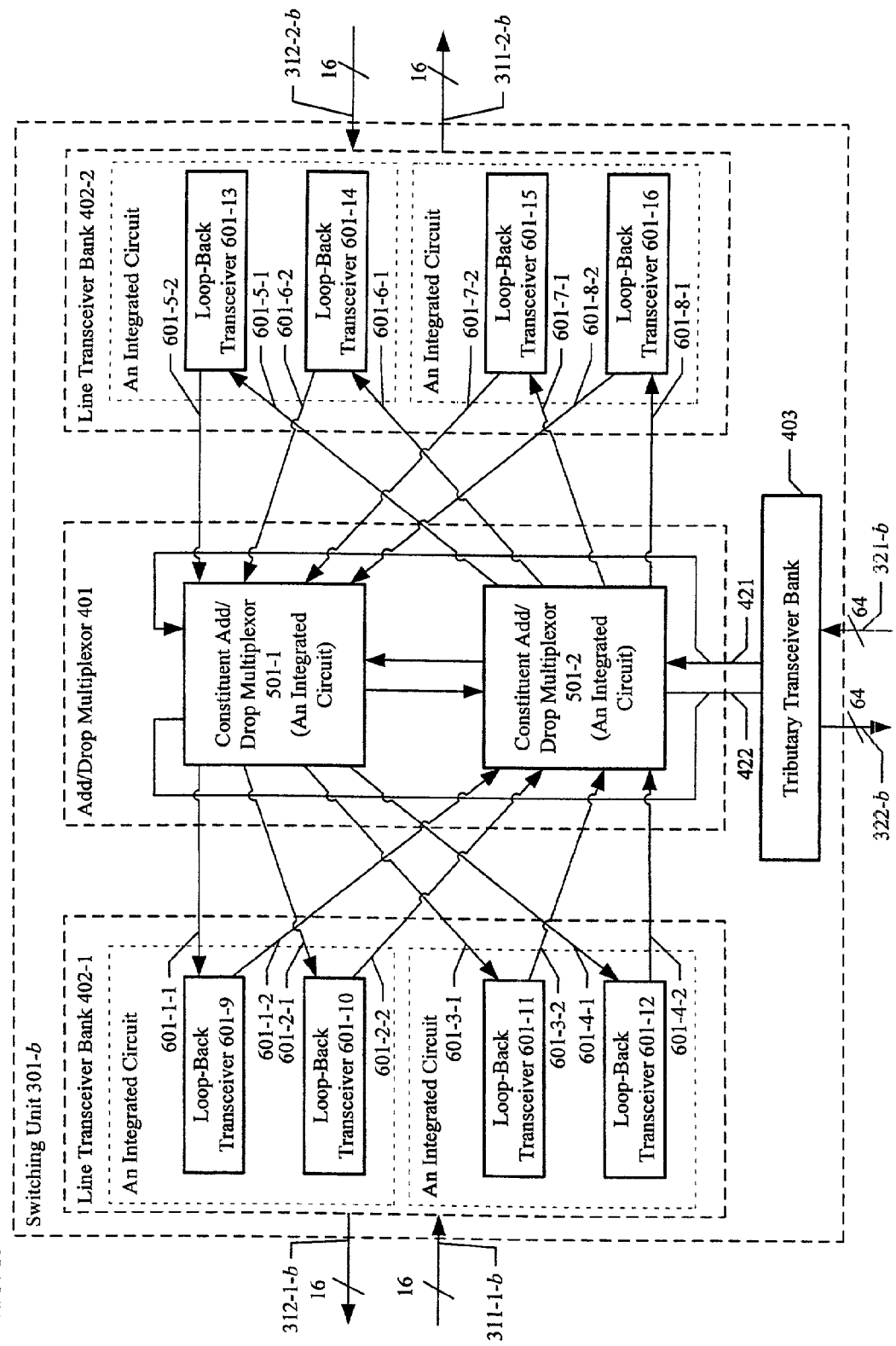
FIG. 15 depicts an alternative representation of switching unit 301-$b$, as shown in FIG. 3.

FIG. 15 depicts a block diagram of switching unit 301-$b$, in which the interconnections between add/drop multiplexor 401, line transceiver bank 402-1, and line transceiver bank 402-2 are shown so as to highlight the criss-cross nature of the loop-back mechanism in switching unit 301-$b$. Note that the buses interconnecting add/drop multiplexor 401 with line transceiver block 402-1 and with line transceiver block 402-2 are in a criss-cross pattern. The criss-cross pattern is a characteristic of the architecture in the illustrative embodiment of the present invention, in which loop-back transceiver 601-$q$ processes signals bi-directionally, constituent add/drop multiplexor 501-1 processes line signals traveling from right to left (as depicted), and constituent add/drop multiplexor 501-2 processes line signals traveling from left to right (as depicted).

Figure 16:
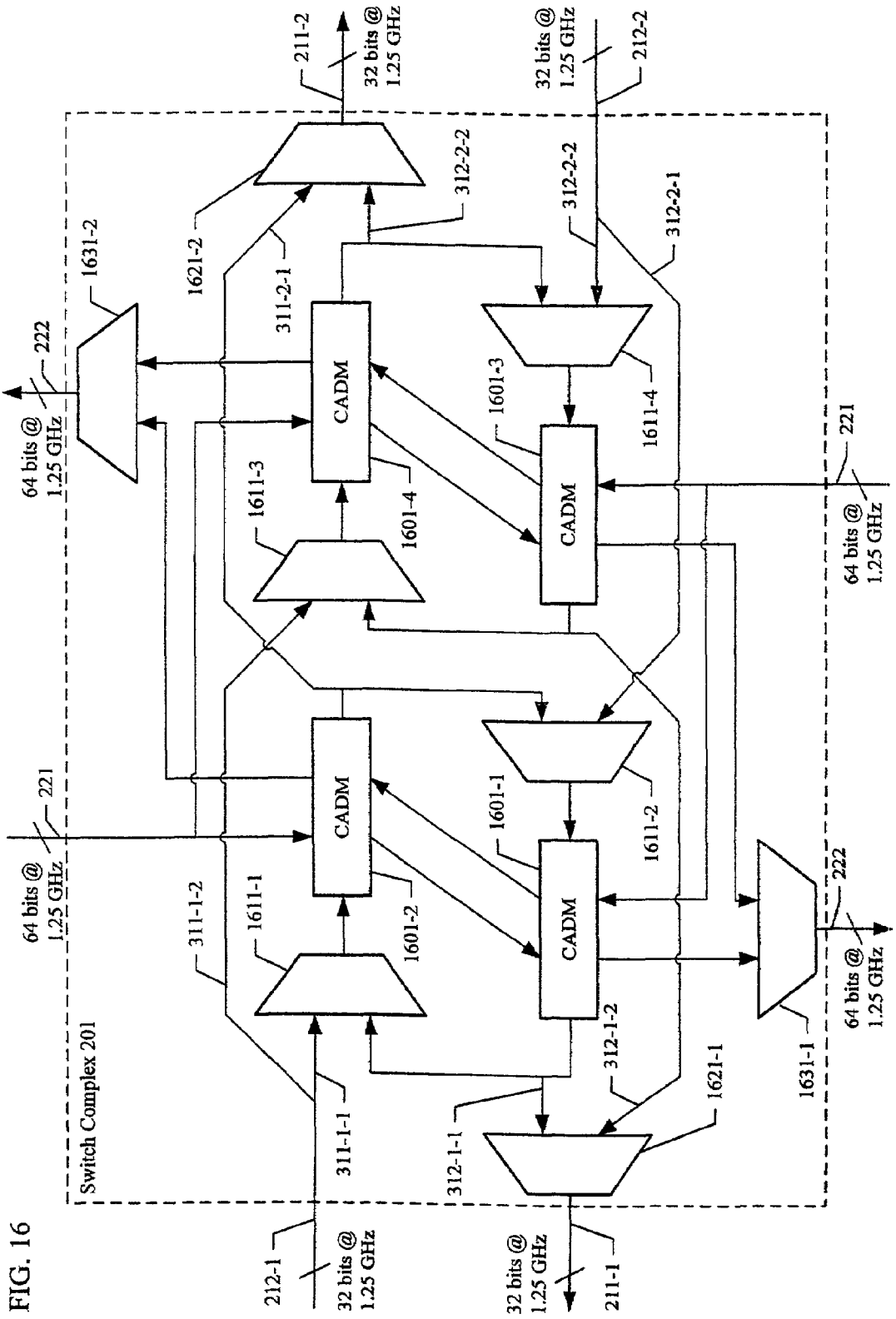
FIG. 16 depicts an alternative representation of switch complex 201, as shown in FIG. 2.

FIG. 16 depicts a block diagram of the functional signal flows through switch complex 201. FIG. 16 depict the buses throughout switch complex 201, in relation to the four (4) constituent add/drop multiplexors ("CADM") and the eight logical multiplexors in switch complex 201.

Constituent add/drop multiplexor 1601-1 is constituent add/drop multiplexor 501-1 in switching unit 301-1. Constituent add/drop multiplexor 1601-2 is constituent add/drop multiplexor 501-2 in switching unit 301-1. Constituent add/drop multiplexor 1601-3 is constituent add/drop multiplexor 501-1 in switching unit 301-2. Constituent add/drop multiplexor 1601-4 is constituent add/drop multiplexor 501-2 in switching unit 301-2.

Multiplexor 1611-1 is the aggregate multiplexor found in the loop-back transceivers in line transceiver bank 402-1 in switching unit 301-1. Multiplexor 1611-2 is the aggregate multiplexor found in the loop-back transceivers in line transceiver bank 402-2 in switching unit 301-1. Multiplexor 1611-3 is the aggregate multiplexor found in the loop-back transceivers in line transceiver bank 402-1 in switching unit 301-2. Multiplexor 1611-4 is the aggregate multiplexor found in the loop-back transceivers in line transceiver bank 402-2 in switching unit 301-2.

Multiplexor 1621-1 is the aggregate multiplexor found in the loop-back transceivers in line transceiver 302-1 and multiplexor 1621-2 is the aggregate multiplexor found in the loop-back transceivers in line transceiver 302-2.

Multiplexor 1631-1 and multiplexor 1631-2 are together found in the loop-back transceivers in tributary transceiver bank 303.

It is to be understood that the above-described embodiments are merely illustrative of the present invention and that many variations of the above-described embodiments can be devised by those skilled in the art without departing from the scope of the invention. It is therefore intended that such variations be included within the scope of the following claims and their equivalents.

What is claimed is:

1. An integrated circuit comprising:
   a first serializer that serializes a first series of r-bit words to generate a first series of s-bit words;
   a first deserializer that deserializes a second series of s-bit words to generate a second series of r-bit words; and
   a multiplexor for selecting a third series of r-bit words from said first series of r-bit words and said second series of r-bit words;
   wherein r and s are both positive integers and r≧s.

2. The integrated circuit of claim 1 wherein said first serializer adds parity bits to said first series of r-bit words to enable the forward error correction of said first series of s-bit words.

3. The integrated circuit of claim 1 wherein said first serializer adds framing bits to said first series of r-bit words to enable the frame synchronization of said first series of s-bit words.

4. The integrated circuit of claim 1 wherein said first deserializer performs forward error correction on said second series of s-bit words.

5. The integrated circuit of claim 1 further comprising:
   a first plurality of drivers for driving said first series of s-bit words off of said integrated circuit via a first plurality of pads; and
   a second plurality of drivers for driving said first series of s-bit words off of said integrated circuit via a second plurality of pads.

6. The integrated circuit of claim 1 wherein said first series of s-bit words and said third series of r-bit words are driven off of said integrated circuit; and
   wherein said first series of r-bit words and said second series of s-bit words are received from off of said integrated circuit.

7. The integrated circuit of claim 1 further comprising a second deserializer that deserializes a third series of s-bit words to generate a fourth series of r-bit words; and
   wherein said multiplexor selects said third series of r-bit words from said first series of r-bit words, said second series of r-bit words, and said fourth series of r-bit words.

8. The integrated circuit of claim 7 wherein said second deserializer performs forward error correction on said third series of s-bit words.

9. An integrated circuit comprising:
   a first serializer that serializes a first series of r-bit words to generate a first series of s-bit words;
   a first deserializer that deserializes said first series of s-bit words to generate a second series of r-bit words;
   a second deserializer that deserializes a second series of s-bit words to generate a third series of r-bit words; and
   a multiplexor for selecting a fourth series of r-bit words from said second series of r-bit words and said third series of r-bit words;
   wherein r and s are both positive integers and r≧s.

10. The integrated circuit of claim 9 wherein said first serializer adds parity bits to said first series of r-bit words to enable the forward error correction of said first series of s-bit words.

11. The integrated circuit of claim 9 wherein said first serializer adds framing bits to said first series of r-bit words to enable the frame synchronization of said first series of s-bit words.

12. The integrated circuit of claim 9 wherein said first deserializer performs forward error correction on said second series of s-bit words.

13. The integrated circuit of claim 9 further comprising:
   a first plurality of drivers for driving said first series of s-bit words off of said integrated circuit via a first plurality of pads; and
   a second plurality of drivers for driving said first series of s-bit words off of said integrated circuit via a second plurality of pads.

14. The integrated circuit of claim 9 wherein said first series of s-bit words and said fourth series of r-bit words are driven off of said integrated circuit; and
   wherein said first series of r-bit words and said second series of s-bit words are received from off of said integrated circuit.

15. The integrated circuit of claim 9 further comprising a third deserializer that deserializes a third series of s-bit words to generate a fifth series of r-bit words; and
   wherein said multiplexor selects said fourth series of r-bit words from said second series of r-bit words, said third series of r-bit words, and said fifth series of r-bit words.

16. The integrated circuit of claim 15 wherein said third deserializer performs forward error correction on said third series of s-bit words.

17. An integrated circuit comprising:
   a first serializer that serializes a first series of r-bit words to generate a first series of s-bit words;
   a first multiplexor for selecting a second series of s-bit words from said first series of s-bit words and a third series of s-bit words; and
   a first deserializer that deserializes said second series of s-bit words to generate a second series of r-bit words;
   wherein r and s are both positive integers and r≧s.

18. The integrated circuit of claim 17 wherein said first serializer adds parity bits to said first series of r-bit words to enable the forward error correction of said first series of s-bit words.

19. The integrated circuit of claim 17 wherein said first serializer adds framing bits to said first series of r-bit words to enable the frame synchronization of said first series of s-bit words.

20. The integrated circuit of claim 17 wherein said first deserializer performs forward error correction on said second series of s-bit words.

21. The integrated circuit of claim 17 further comprising:
   a first plurality of drivers for driving said first series of s-bit words off of said integrated circuit via a first plurality of pads; and
   a second plurality of drivers for driving said first series of s-bit words off of said integrated circuit via a second plurality of pads.

22. The integrated circuit of claim 17 further comprising:
   a second deserializer that deserializes a fourth series of s-bit words to generate a third series of r-bit words; and
   a second multiplexor for selecting a fourth series of r-bit words from said second series of r-bit words and said third series of r-bit words.

23. The integrated circuit of claim 22 wherein said second deserializer performs forward error correction on said fourth series of s-bit words.

24. The integrated circuit of claim 22 wherein said first series of s-bit words and said fourth series of r-bit words are driven off of said integrated circuit; and
   wherein said first series of r-bit words, said third series of s-bit words, and said fourth series of s-bit words are received from off of said integrated circuit.

* * * * *